United States Patent
Hamada

(10) Patent No.: US 7,630,404 B2
(45) Date of Patent: Dec. 8, 2009

(54) DATA OUTPUT APPARATUS, DECODING APPARATUS, AND RECORDING MEDIUM

(75) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 717 days.

(21) Appl. No.: 11/311,566

(22) Filed: Dec. 19, 2005

(65) Prior Publication Data

US 2006/0133423 A1    Jun. 22, 2006

(30) Foreign Application Priority Data

Dec. 21, 2004   (JP)   ............... 2004-369894

(51) Int. Cl.
*H04J 3/24*     (2006.01)
*H04J 3/04*     (2006.01)
*H04N 11/04*    (2006.01)

(52) U.S. Cl. ................ 370/474; 370/535; 375/240.25

(58) Field of Classification Search ................ 370/474, 370/522, 527, 529, 535; 375/240.25, 240.26; 725/144, 151

See application file for complete search history.

(56) References Cited

U.S. PATENT DOCUMENTS

| | | | | |
|---|---|---|---|---|
| 5,644,660 | A | * | 7/1997 | Bruder ................ 382/232 |
| 5,819,034 | A | * | 10/1998 | Joseph et al. ........... 709/201 |
| 6,128,317 | A | * | 10/2000 | Mackre ............... 370/479 |
| 6,301,301 | B1 | * | 10/2001 | Isu et al. ............. 375/240.14 |
| 6,317,518 | B1 | * | 11/2001 | Enari ................ 382/232 |
| 6,453,071 | B2 | * | 9/2002 | Ito et al. ............. 382/232 |
| 6,570,926 | B1 | * | 5/2003 | Agrawal et al. ......... 375/240.27 |
| 2001/0048721 | A1 | * | 12/2001 | Kato ................. 375/240.25 |
| 2004/0240561 | A1 | * | 12/2004 | Crinon ............... 375/240.26 |

FOREIGN PATENT DOCUMENTS

| | | |
|---|---|---|
| JP | 09-074556 B2 | 3/1997 |
| JP | 9-154131 A | 6/1997 |
| JP | 2001-326615 A | 11/2001 |

OTHER PUBLICATIONS

Japanese Office Action dated Mar. 3, 2009 (2 pages), and English translation thereof (3 pages) issued in counterpart Japanese Application No. 2004-369894.

* cited by examiner

*Primary Examiner*—Chi H Pham
*Assistant Examiner*—Warner Wong
(74) *Attorney, Agent, or Firm*—Frishauf, Holtz, Goodman & Chick, P.C.

(57) ABSTRACT

A data output apparatus generates and transmits a data stream in which content data coded by a default coding method and a decoding program for content data coded by a changeable coding method are multiplexed together. The decoding program is multiplexed on the data stream plural times repeatedly at predetermined intervals. A decoding apparatus receives the data stream transmitted by the data output apparatus, and acquires and installs the multiplexed decoding program. Until the decoding program is completely installed to be executable, the decoding apparatus decodes the content data by a decoding process corresponding to the default coding method. When the decoding program is completely installed, the decoding apparatus executes the decoding program and decodes the content data by a decoding process corresponding to the changeable coding method.

10 Claims, 15 Drawing Sheets

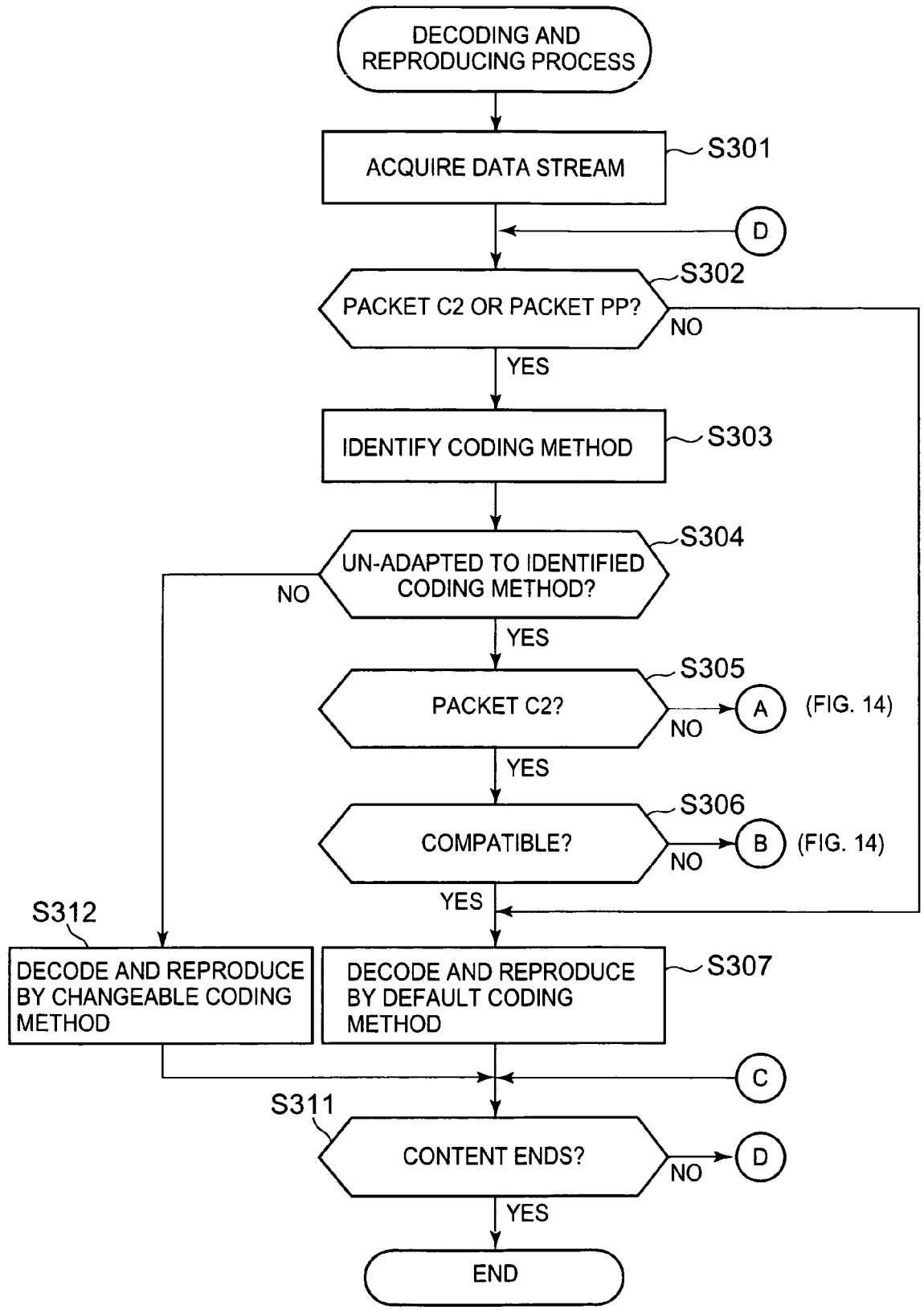

DATA OUTPUT APPARATUS, DECODING APPARATUS, AND RECORDING MEDIUM

BACKGROUND OF THE INVENTION

1. Field of the Invention

The present invention relates to a data output apparatus, a decoding apparatus, and a recording medium, and particularly relates to a data output apparatus, etc. suitable for digital television broadcasting, etc.

2. Description of the Related Art

In recent years, streaming reproduction of a motion picture file via the Internet and digitalization of television broadcasting has become widely spread. Such motion picture digital data are coded (compressed) based on standards such as MPEG-1, MPEG-2, MPEG-4 (MPEG: Motion Picture Experts Group), ITU-T, H.264, etc., when they are transmitted.

Conventionally, since these standards completely define the coding method, modifications or improvements of the coding method, when they become necessary, have caused confusions about compatibility. Because of this, although the progresses in the coding technologies have made it possible to make a partial improvement to the coding method, it is difficult to enable the decoder side to deal with the coding method wherever such an improvement is made.

In view of this circumstance, there have been proposed methods for allowing the reproducing apparatus side to acquire a necessary decoding program (as disclosed in, for example, the publication of Japanese Patent No. 3304241).

SUMMARY OF THE INVENTION

According to such prior methods, it is only after the program is downloaded first and then the downloaded program is installed, when the motion picture reproduction starts. Accordingly, these methods have a problem that the waiting time before the reproduction starts, i.e., the latency is extremely large.

This problem has found these methods unsuitable for frequent use for replacing the decoding programs often with other ones that are better suited to the contents of the respective motion pictures.

Further, since the program has to be downloaded first, these methods could not have been applied to the television broadcasts, which the audience might start to watch in the middle of their streaming.

The present invention has been made in consideration of the above circumstances, and an object of the present invention is to provide a data generation apparatus, etc. capable of acquiring a necessary decoding program while performing streaming reproduction.

To achieve the above object, a data output apparatus generates and transmits a data stream including content data coded by a default coding method and content data coded by a changeable coding method on which a decoding program corresponding to the changeable coding method is multiplexed. The decoding program is multiplexed on the data stream plural times repeatedly at predetermined intervals. A decoding apparatus receives the data stream transmitted by the data output apparatus, acquires the decoding program multiplexed thereon, and installs it. Until the decoding program is completely installed and made executable, the decoding apparatus decodes the content data by a decoding process corresponding to the default coding method. When the installment of the decoding program is completed, the decoding apparatus executes the decoding program and decodes the content data by a decoding process corresponding to the changeable coding method.

BRIEF DESCRIPTION OF THE DRAWINGS

These objects and other objects and advantages of the present invention will become more apparent upon reading of the following detailed description and the accompanying drawings in which:

FIG. 11A illustrates the data structure of a packet C11, FIG. 11B illustrates the data structure of a packet C2, and FIG. 11C illustrates the data structure of a packet PP;

FIG. 12A illustrates the packet arrangement when a decoding program is multiplexed on content data, FIG. 12B illustrates the packet arrangement during a redundancy period, and FIG. 12C illustrates the packet arrangement when a default coding method is switched to a changeable coding method;

FIG. 13 is a flowchart for explaining a decoding and reproducing process according to the embodiments of the present invention;

FIG. 16A shows he configuration of a case where the embodiment 5 is realized by the broadcasting system according to the embodiments 1 to 3, and FIG. 16B shows the configuration of a case where the embodiment 5 is realized by the distribution system according to the embodiment 4.

DETAILED DESCRIPTION OF THE PREFERRED EMBODIMENTS

Embodiment 1

Figure 1:
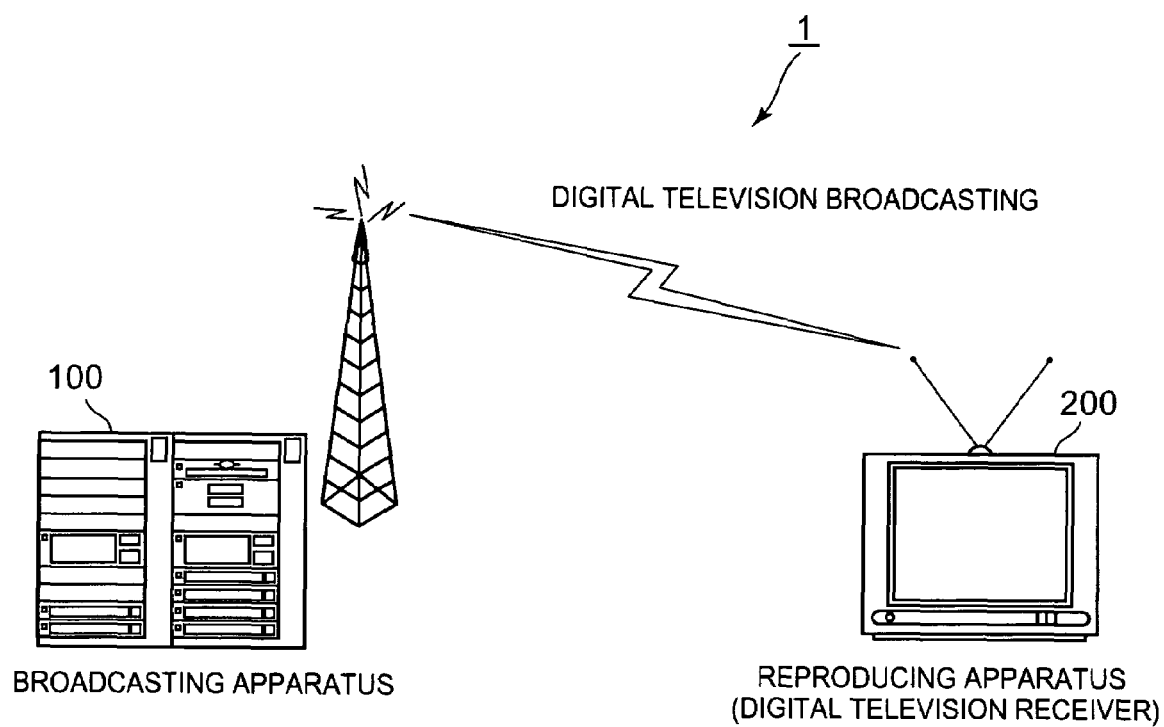
FIG. 1 is a diagram exemplarily showing the configuration of a broadcasting system according to an embodiment 1 of the present invention.

One embodiment of the present invention will be explained with reference to the drawings. In the present embodiment, the explanation will concern an example where the present invention is applied to digital television broadcasting. FIG. 1 is a diagram exemplarily showing the configuration of a broadcasting system 1 according to the present embodiment. As shown in FIG. 1, the broadcasting system 1 comprises a broadcasting apparatus 100, and a reproducing apparatus 200 (for example, a digital television receiver).

Figure 2:
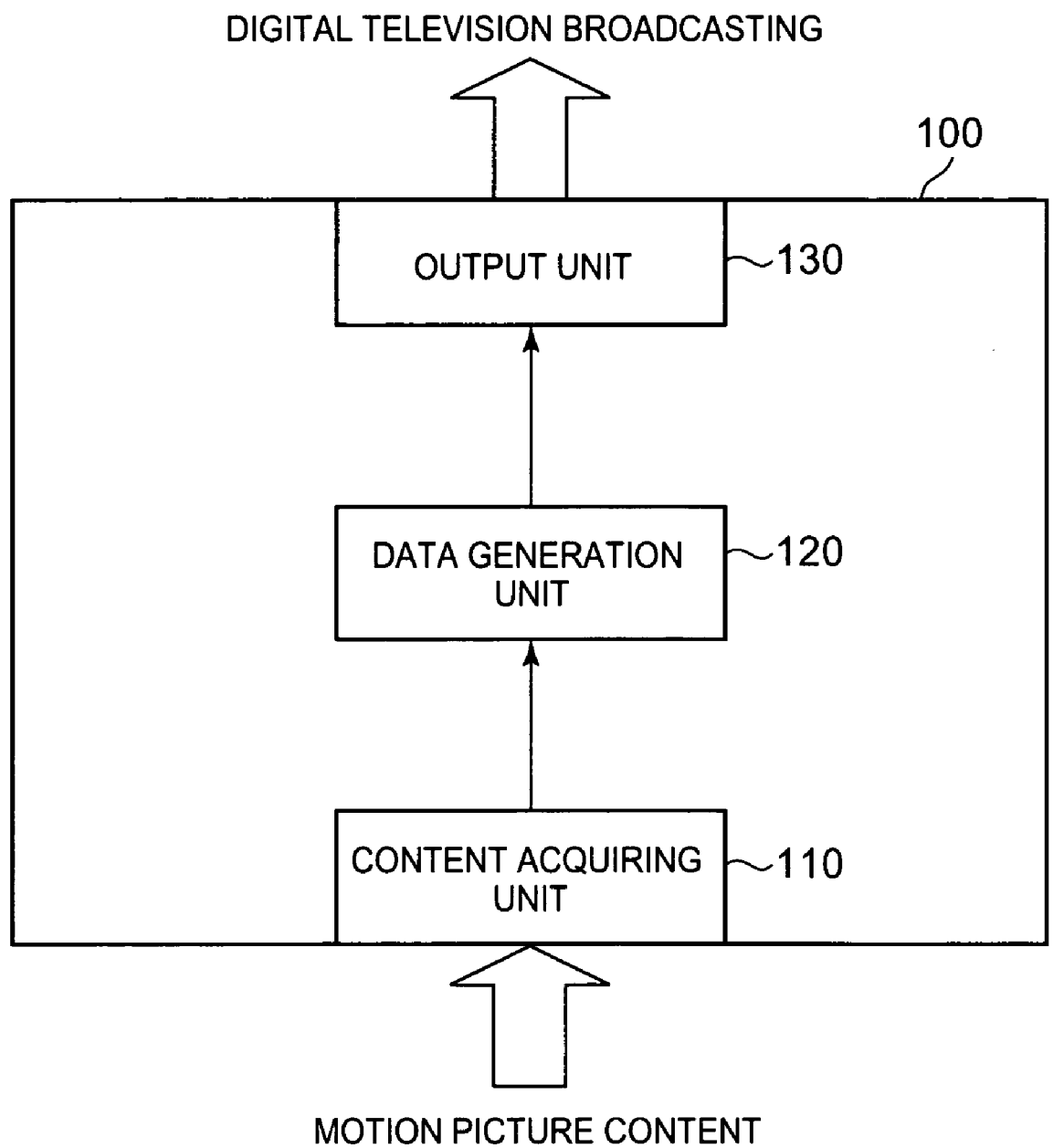
FIG. 2 is a block diagram showing the configuration of a broadcasting apparatus.

The broadcasting apparatus 100 performs digital television broadcasting, such as digital terrestrial broadcasting, satellite digital broadcasting, etc. The configuration of the broadcasting apparatus 100 will be explained with reference to FIG. 2. FIG. 2 is a block diagram showing the configuration of the broadcasting apparatus 100. As shown in FIG. 2, the broadcasting apparatus 100 comprises a content acquiring unit 110, a data generation unit 120, and an output unit 130.

The content acquiring unit 110 acquires data representing the content to be broadcast via television broadcasting. That is, the content is a motion picture content such as a television program, that is made up of videos and audios. Such a motion picture content is recorded on a predetermined recording medium such as a video tape, etc. Thus, the content acquiring unit 110 comprises a device which reproduces such a recording medium to acquire a motion picture signal representing a motion picture content.

The data generation unit 120 generates digital data that is to be distributed via digital television broadcasting as a motion picture content acquired by the content acquiring unit 110. The data generation unit 120 will be specifically explained below with reference to FIG. 3.

Figure 3:
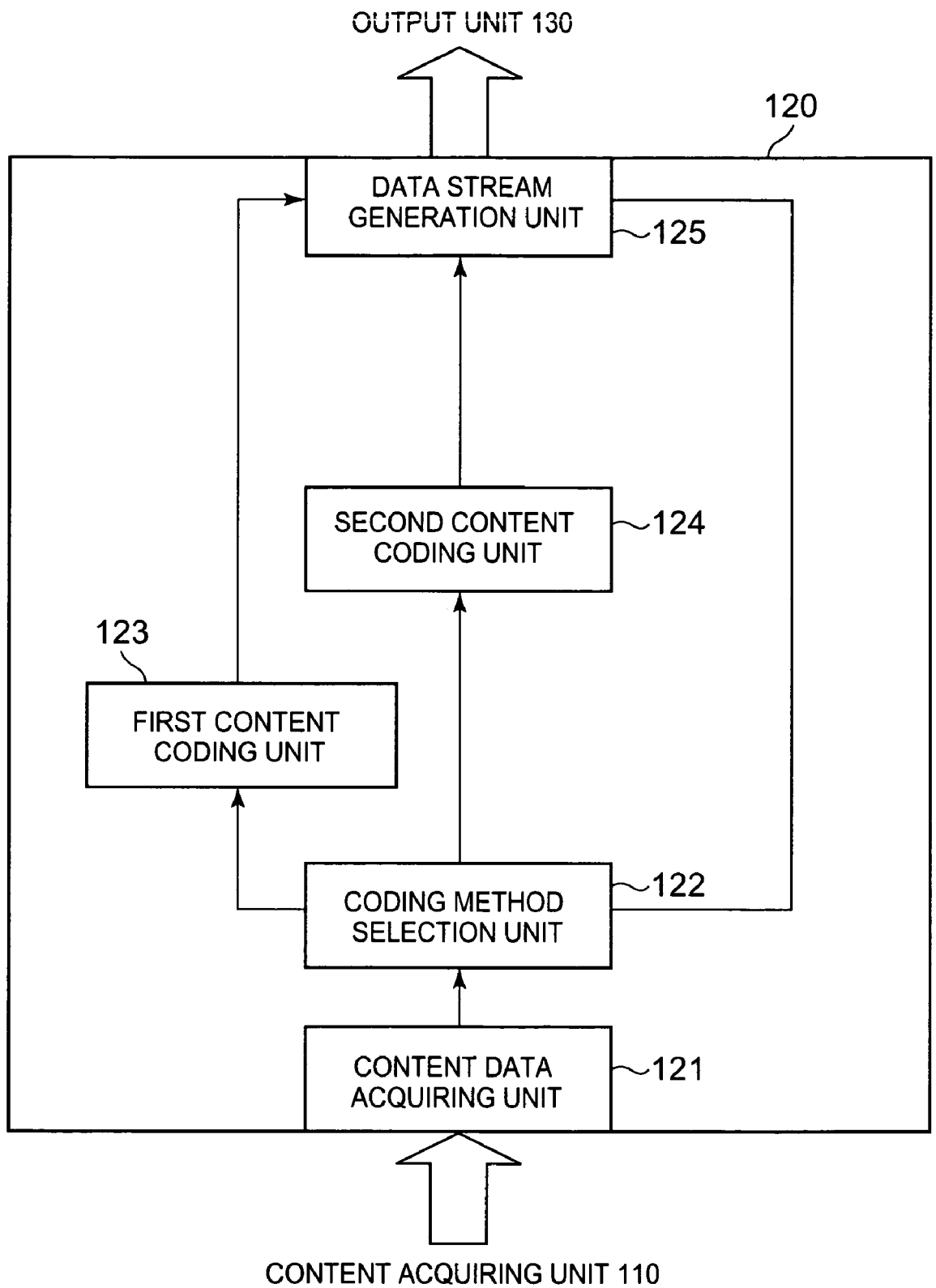
FIG. 3 is a block diagram showing the configuration of a data generation unit.

FIG. 3 is a block diagram showing the configuration of the data generation unit 120. As shown n FIG. 3, the data generation unit 120 comprises a content data acquiring unit 121, a coding method selection unit 122, a first content coding unit 123, a second content coding unit 124, and a data stream generation unit 125.

The content data acquiring unit 121 acquires a reproduction signal reproducing a motion picture content from the content acquiring unit 110. The reproduction signal is acquired sequentially in the unit of frames (pictures) forming a motion picture sequence.

The coding method selection unit 122 selects the method of coding the motion picture content acquired by the content data acquiring unit 121. According to the present embodiment, the selection is made between two types of coding methods, namely a default coding method (first coding method) and a changeable coding method (second coding method).

The "default coding method" is, for example, a method that is so widely spread that many types of reproducing apparatuses 200 can decode it. The "changeable coding method" is a newcomer coding method or the like made to appear as a result of the specification of a default coding method being modified, etc., so not so widely spread yet. The reproducing apparatus 200 on the decoder side will perform the decoding operations mainly in accordance with the default coding method, while timely switching to be in accordance with the changeable coding method. According to the present embodiment, the broadcasting apparatus 100 supplies the reproducing apparatus 200 with a decoding program necessary for decoding the data that is coded by the changeable coding method, by multiplexing the program on the content data. That is, the changeable coding method is externally dynamically applied to the reproducing apparatus 200.

For example, in case of a motion-compensated interframe differential coding method utilizing macroblock matching, if a ½ pel (picture element) method for performing matching in the unit of ½ pixel is the default coding method, the ½ pel method may be modified to a ¼ pel coding method for performing matching in the unit of ¼ pixel that is more precise than the ½ pixel unit, and the ¼ pel method may be used as the changeable coding method. In this example, since the syntax of the data to be coded remains the same, it is only necessary to change the inter-prediction algorithm, with the configuration concerning the syntax analysis unchanged.

The coding method selection unit 122 selects coding methods as required, so that the coding methods may be switched at required timings while one content is being coded. Then, the coding method selection unit 122 supplies the motion picture content data to the first content coding unit 123 or to the second content coding unit 124, depending on the coding method being selected. When supplying the motion picture content data to the first content coding unit 123 and the second content coding unit 124, the coding method selection unit 122 affixes predetermined identification (ID) information corresponding to the selection and switching timings, etc. to the motion picture content data, as will be described later.

The coding method selection unit 122 determines a coding mode of the selected coding method for each frame (picture). For example, the interframe differential coding method includes an inter-prediction coding mode for performing coding based on a prediction utilizing a past frame, and an intra-prediction coding mode that is self-contained within the current frame. The coding method selection unit 122 determines which of these coding modes to adopt. Since generally the inter-prediction coding mode can code a less amount of data, the intra-prediction coding mode is adopted for the frame at the start of the content or for the frame that has a large amount of change from the previous frame such as at the time of a scene change or the like. On the other hand, it is common to adopt the inter-prediction coding mode for the other frames to restrict the total amount of coding. Thus, the coding method selection unit 122 selects a suitable coding mode in accordance with the content of the motion picture input thereto or the passage of the time.

That is, the motion-compensated prediction in the inter-prediction coding mode is effective in a case where there is little change between frames, however, appropriate coding is not available if there is much change between frames. Further, the motion-compensated prediction cannot be performed for the top frame having no reference frame therebefore. Accordingly, the intra-prediction coding mode is applied for the top frame or the frame at the scene change.

In other words, the frame to which the intra-prediction coding mode is applied can be said to be a frame to serve as a reference for the motion-compensated prediction. Hence, by applying the default coding method to the frames that are to serve as references for the motion-compensated prediction, it is possible to enable decoding and reproducing to be attained by even those reproducing apparatuses 200 that have not yet been tuned to the changeable coding method. Thus, the coding method selection unit 122 selects the coding method to be adopted when coding a frame, in accordance with the coding mode selected for each frame.

Assuming that the inter-prediction coding mode is in a more upward reproduction layer than the intra-prediction coding mode, the coding method selection unit 122 selects he changeable coding method for a frame of the more upward layer, and selects the default coding method for a frame of a more backward layer.

The first content coding unit 123 codes the motion picture content data supplied from the coding method selection unit 122 by the default coding method, and supplies the coded digital data (hereinafter referred to as "first coded data") to the data stream generation unit 125.

The second content coded unit 124 codes the motion picture content data supplied from the coding method selection unit 122 by the changeable coding method, and supplies the coded digital data (hereinafter referred to as "second coded data") to the data stream generation unit 125.

The first content coding unit 123 and the second content coding unit 124 code the motion picture by following a known coding procedure. For example, they perform coding by the motion-compensated interframe differential coding method utilizing macroblock matching.

The first content coding unit 123 and the second content coding unit 124 also code the audios attached to the motion picture to be coded. For example, they perform coding of audios by coding methods such MPEG-1 audio, TwinVQ (Transform-domain Weighted Interleave Vector Quantization), or MPEG-2/AAC (Advanced Audio Coding). The audio coding method is selected in accordance with the coding method for the motion picture. The coding method selection unit 122 may select or instruct the selection for the audio coding method.

The data stream generation unit 125 generates a data stream including the first coded data and the second coded data supplied from the first content coding unit 123 and the second content coding unit 124, by arranging the packets of the first and second coded data. That is, the data stream generation unit 125 generates a data stream in which the content is coded. The data stream generation unit 125 transfers the generated data stream to the output unit 130.

Figure 4:
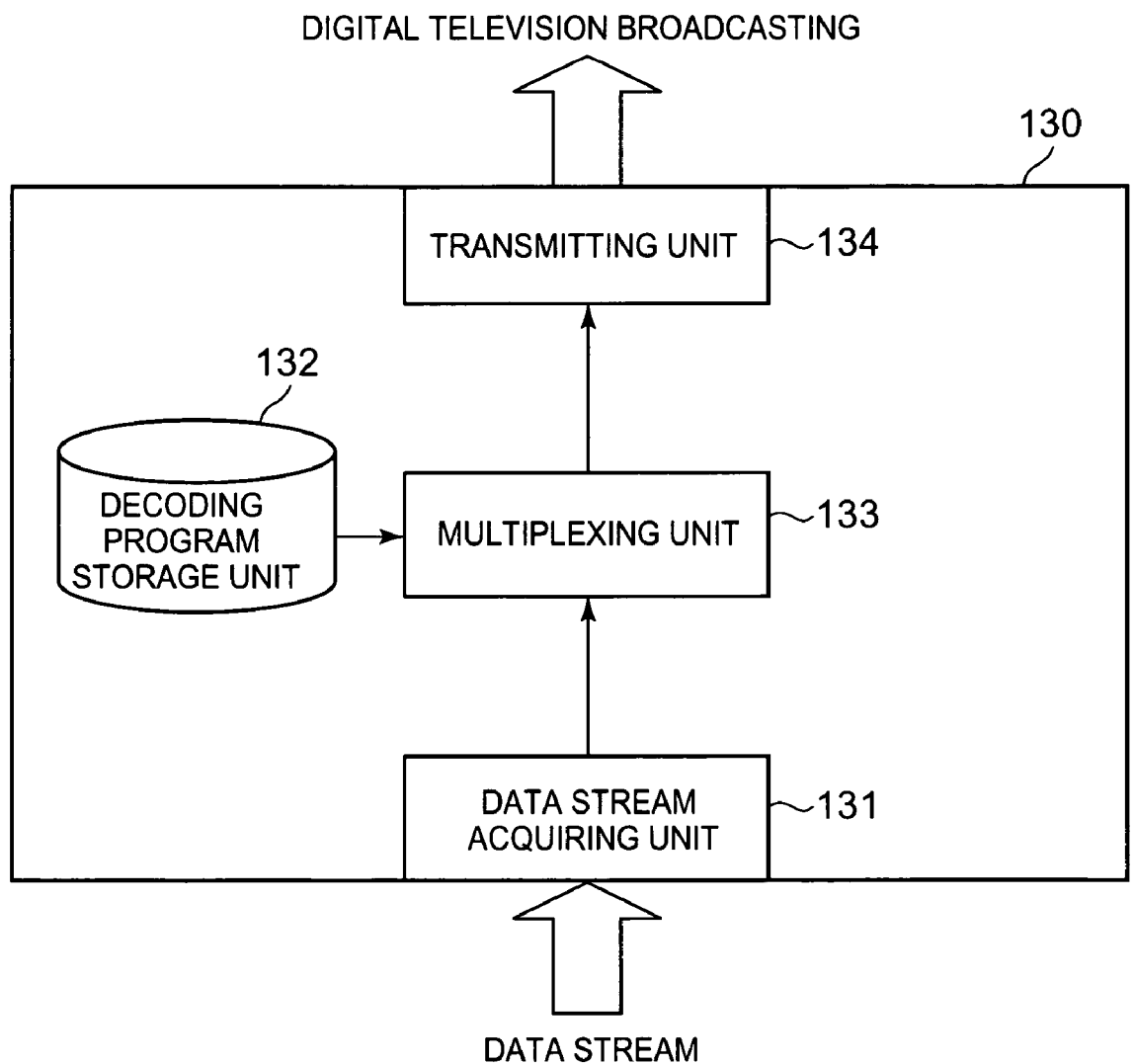
FIG. 4 is a block diagram showing the configuration of an output unit.

The output unit 130 superposes the data stream supplied from the data generation unit 120 on a predetermined carrier wave, and performs television broadcasting of the data stream by transmitting it out through an antenna or the like. The output unit 130 performs digital television broadcasting by performing broadcasting transmission on a carrier wave that is used for digital terrestrial broadcasting and satellite digital broadcasting. The output unit 130 according to the present embodiment transmits the data stream and a program that are supplied from the data generation unit 120. To be more specific, by multiplexing a program on the data stream representing the content, it simultaneously transmits the content data and the program. The configuration of such an output unit 130 will be explained with reference to FIG. 4. FIG. 4 is a block diagram showing the configuration of the output unit 130.

As shown in FIG. 4, the output unit 130 comprises a data stream acquiring unit 131, a decoding program storage unit 132, a multiplexing unit 133, and a transmitting unit 134.

The data stream acquiring unit 131 connects the output unit 130 to the data generation unit 120, and acquires the data stream generated by the data stream generation unit 125 of the data generation unit 120.

The decoding program storage unit 132 is constituted by a storage device such as a ROM (Read Only Memory), an EEPROM (Electrically Erasable Programmable ROM), a hard disk device, etc., and stores the programs to be supplied to the reproducing apparatus 200 on the decoder side together with the content data to be transmitted. According to the present embodiment, the data representing the content to be broadcast is transmitted with the program multiplexed thereon. Therefore, the decoding program storage unit 132 stores the programs to be multiplexed on the content data. According to the present embodiment, transmitted together with the content data is the program (hereinafter referred to as "decoding program") to be executed by the reproducing apparatus 200, such as the algorithm for decoding the data coded by the changeable coding method, a filter to be used for post-decoding processes (for example, an in-loop filter or post-filter for deblocking, etc.)etc. Thus, the decoding program storage unit 132 stores these decoding programs.

The interframe differential coding method includes a decoding operation which is called local decoding during the process of coding. That is, the reproducing apparatus 200 locally decodes the coded data to obtain a reference frame to be used for detecting the difference of the next frame. In order for the coded data to be appropriately decoded, the decoding algorithm for the local decoding has to be matched with the decoding algorithm of the reproducing apparatus 200. Thus, according to the present embodiment, the reproducing apparatus 200 executes the decoding program used by the data generation unit 120 for the local decoding, so that the data coded by the data generation unit 120 will be decoded.

According to the present embodiment, it is assumed that all reproducing apparatuses 200 have been adapted to the default coding method, and all reproducing apparatuses 200 are not adapted to the changeable coding method in their initial state. A transmission of the decoding program corresponding to the changeable coding method which is multiplexed on the content data enables the reproducing apparatus 200 to decode the data coded by the changeable coding method. That is, since the decoding program to be multiplexed on the content data is a decoding program corresponding to the changeable coding method, the decoding program storage unit 132 stores at least the decoding program corresponding to the changeable coding method.

The multiplexing unit 133 acquires the decoding program stored in the decoding program storage unit 132, divides the decoding program into packets, and multiplexes the decoding program on the content data stream acquired by the data stream acquiring unit 131 by arranging the divided packets with the packets that build up the content data stream.

The transmitting unit 134 superposes the data stream on which the decoding program has been multiplexed on a carrier wave for, for example, digital television broadcasting, and outputs the data stream via an antenna device, etc., thereby transmitting the decoding program together with the data representing the content such as a TV program, etc. That is, the transmitting unit 134 simultaneously transmits the data representing the content to be reproduced by the reproducing apparatus 200 and the decoding program to be executed by the reproducing apparatus 200.

The data generation unit 120 and the output unit 130 having the above-described configurations may be constructed by hardware by employing a physical structure such as an ASIC (Application Specific Integrated Circuit), or may be constructed by software by employing a structure that can be logically realized by a CPU (Central Processing Unit) executing a program for realizing these functions. In the latter case, the data generation unit 120 and the output unit 130 should comprise a storage device, in which the program to be executed by the CPU is stored.

The data generation unit 120 and the output unit 130 may not be constructed integrally. That is, independent apparatuses (a data generation apparatus and an output apparatus) having the configurations and functions of the data generation unit 120 and the output unit 130 respectively may be prepared, so that the data generated by the data generation apparatus will be supplied to the output apparatus.

Figure 5:
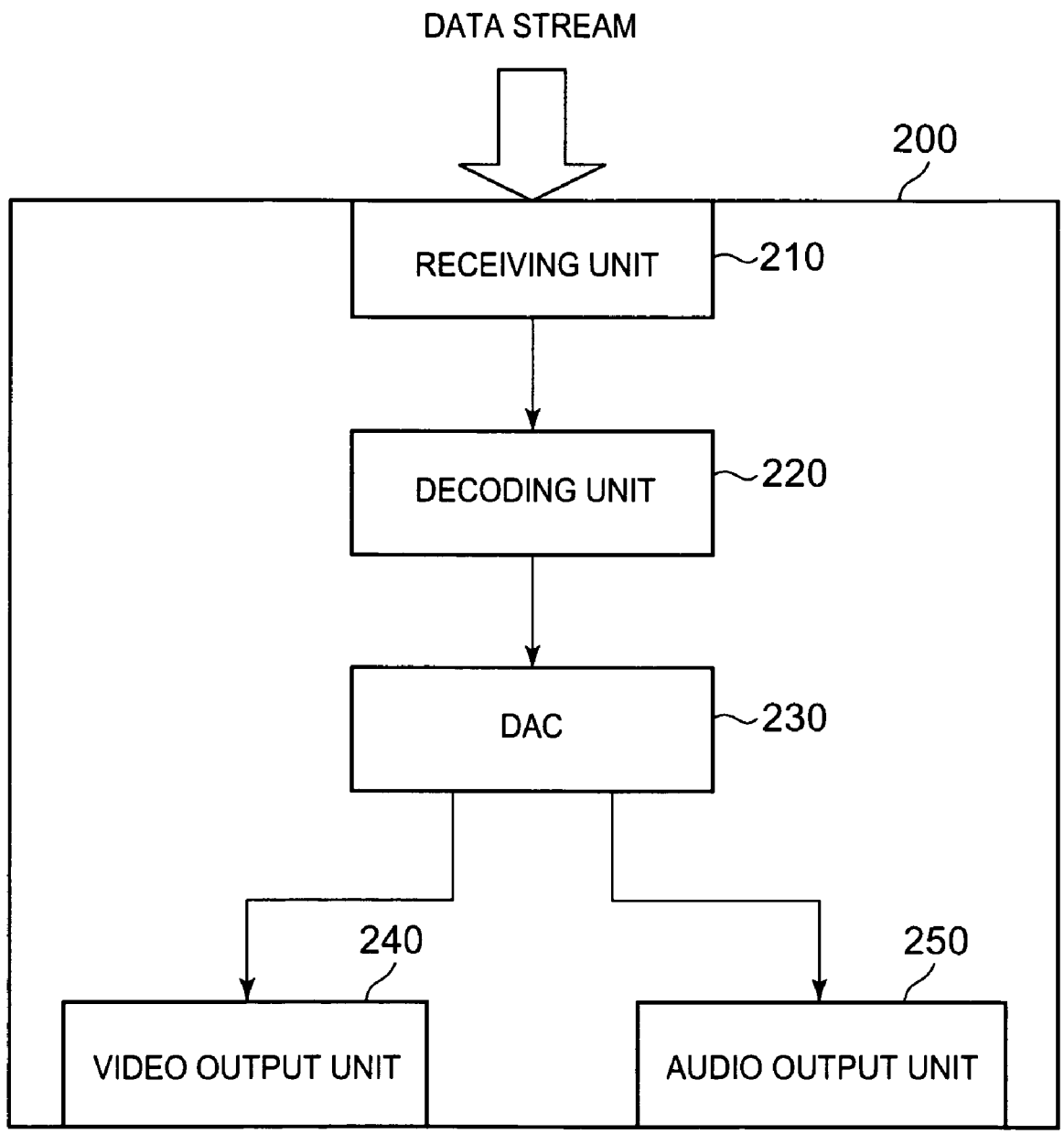
FIG. 5 is a block diagram showing the configuration of a reproducing apparatus.

Next, the configuration of the reproducing apparatus 200 will be explained. The reproducing apparatus 200 according to the present embodiment is, for example, a digital television receiver that receives a digital television broadcast and reproduces it. That is, the reproducing apparatus 200 receives coded digital data, and reproduces the content such as a TV program by decoding the received digital data. The configuration of such a reproducing apparatus 200 will be explained with reference to FIG. 5. FIG. 5 is a block diagram showing the configuration of the reproducing apparatus 200.

As shown in FIG. 5, the reproducing apparatus 200 comprises a receiving unit 210, a decoding unit 220, a DAC 230, a video output unit 240, and an audio output unit 250.

The receiving unit 210 is constituted by, for example, an antenna, a tuner circuit, etc., and receives a carrier wave for digital television broadcasting that has been transmitted by the output unit 130 of the broadcasting apparatus 100. That is, the receiving unit 210 receives the carrier wave on which the data stream generated by the data stream generation unit 125 of the broadcasting apparatus 100 has been superposed. For example, the receiving unit 210 receives a data stream in which content data representing a TV program or the like and a decoding program are multiplexed together.

The decoding unit 220 decodes the data stream received by the receiving unit 210, and acquires the decoding program multiplexed on the data stream. The details of the decoding unit 220 will be described later.

The DAC 230 is a digital-analog converter, which converts the content data (digital data) decoded by the decoding unit 220 into an analog video signal and an analog audio signal, and supplies them to the video output unit 240 and the audio output unit 250.

The video output unit 240 is constituted by, for example, an LCD (liquid crystal display) or the like, and displays images based on the video signal supplied from the DAC 230, thereby outputting and displaying the videos of the broadcast content. The constitution of the video output unit 240 is arbitrary, and may be, for example, an EL (electroluminescence) display, a plasma display, a CRT (Cathode Ray Tube) display, etc. In a case where it is constituted by a display capable of image display based on a digital signal, such a display will display images by acquiring the digital data of the motion picture without the DAC 230 converting the digital data into an analog video signal.

The audio output unit 250 is constituted by, for example, a speaker, and outputs audios of the broadcast content based on the audio signal supplied from the DAC 230.

Figure 6:
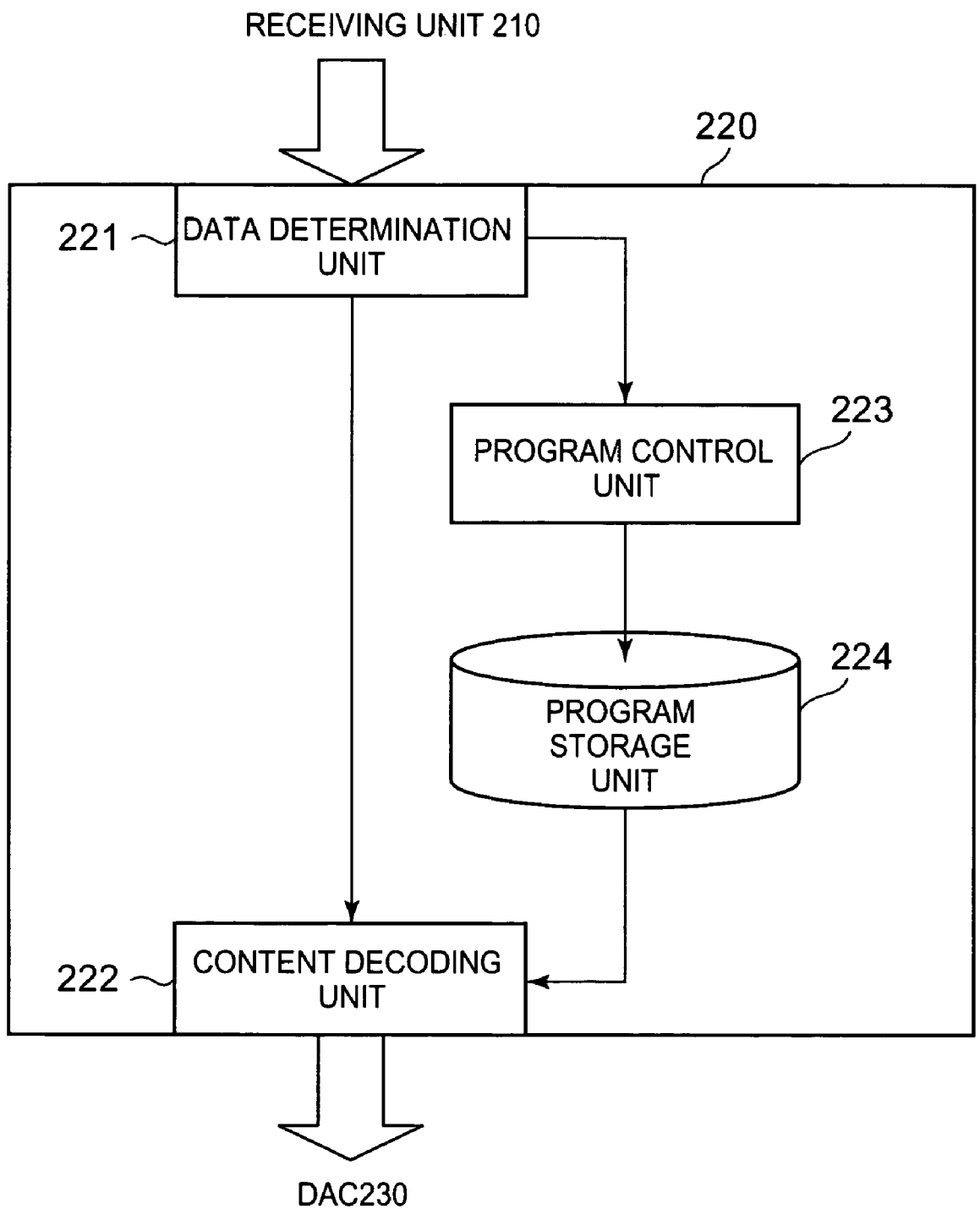
FIG. 6 is a block diagram showing the configuration of a decoding unit.

The details of the decoding unit 220 will now be explained with reference to FIG. 6. FIG. 6 is a block diagram showing the configuration of the decoding unit 220. As shown in FIG. 6, the decoding unit 220 comprises a data determination unit 221, a content decoding unit 222, a program control unit 223, and a program storage unit 224.

The data determination unit 221 sequentially acquires the data stream having received by the receiving unit 210, and determines the type, etc. of the packet now being acquired and building the acquired data stream, by referring to the header information of that packet. The data determination unit 221 supplies the acquired packet to the content decoding unit 222 or to the program control unit 223, in accordance with the determination result. That is, as will be described later, the data determination unit 221 supplies the acquired packet to the content decoding unit 222 in a case where the packet is a "packet C1" or a "packet C2", and supplies the acquired packet to the program control unit 223 in a case where the packet is a "packet PP".

The content decoding unit 222 decodes the packet (packet C1 and packet C2) representing the content that is supplied from the data determination unit 221. The content decoding unit 222 decodes packets by executing the decoding program stored in the program storage unit 224 such as the decoding algorithm and various filters. That is, the decoding unit 220 performs decoding by software processing, by executing the program stored in the program storage unit 224. The content decoding unit 222 switches the programs to be executed, in accordance with the type of the packet supplied from the data determination unit 221, the header information of each packet, etc. Thus, the content decoding unit 222 decodes the packet by a decoding method corresponding to the coding method for the content data sequentially arriving. In a case where compatibility in a more upward layer is found available between plural types of coding methods, the content decoding unit 222 may continue executing the program corresponding to the more upward coding method, without the need of switching the decoding programs.

The program control unit 223 decodes a packet (packet PP) of a decoding program supplied from the data determination unit 221, thereby acquiring the decoding program multiplexed on the data stream. The program control unit 223 stores the newly acquired decoding program in the program storage unit 224, so that this decoding program can be executed by the content decoding unit 222. This completes the application (installation) onto the decoding unit 220 of the decoding program multiplexed on the data stream transmitted from the broadcasting apparatus 100.

The program storage unit 224 is constituted by a rewritable recording medium such as a hard disk, a RAM (Random Access Memory), an EEPROM, and stores programs to be executed by the content decoding unit 222 for the decoding operation. According to he present embodiment, since the reproducing apparatus 200 is adapted to the default coding method, the decoding program corresponding to the default coding method is pre-stored in the program storage unit 224. The decoding program acquired from the received data stream is made executable by being stored in the program storage unit 224.

The reproducing apparatus 200 having the above-described configuration may, needless to say, be constituted by a specialized apparatus such as a television receiver as described, and also may be constituted by a general-purpose computer apparatus such as a personal computer, etc. In the latter case, by incorporating a tuner circuit for receiving a television broadcast, a general-purpose computer apparatus can be configured to receive a television broadcast and display a reproduced image on a display device. Alternatively, a general-purpose computer apparatus so configured may be connected to a television receiver, so that the general-purpose computer apparatus may decode the signal received by the television receiver and the television receiver in turn may display the decoded reproduction signal. In a case where the reproducing apparatus 200 is constituted by a specialized apparatus such as a television receiver, the decoding unit 220 may be constituted by, for example, a programmable circuit such as an FPGA (Field Programmable Gate Array), etc.

The operation of the broadcasting system 1 having the above-described configuration will now be explained with reference to the drawings. In the broadcasting system 1 according to the present embodiment, the broadcasting apparatus 100 broadcasts a content such as a TV program by a digital method, and the reproducing apparatus 200 receives the broadcast radio and reproduces it, thereby digital television broadcasting is carried out. The "broadcasting process" to be performed by the broadcasting apparatus 100 in this flow will be explained with reference to the flowchart shown in FIG. 7.

Figure 7:
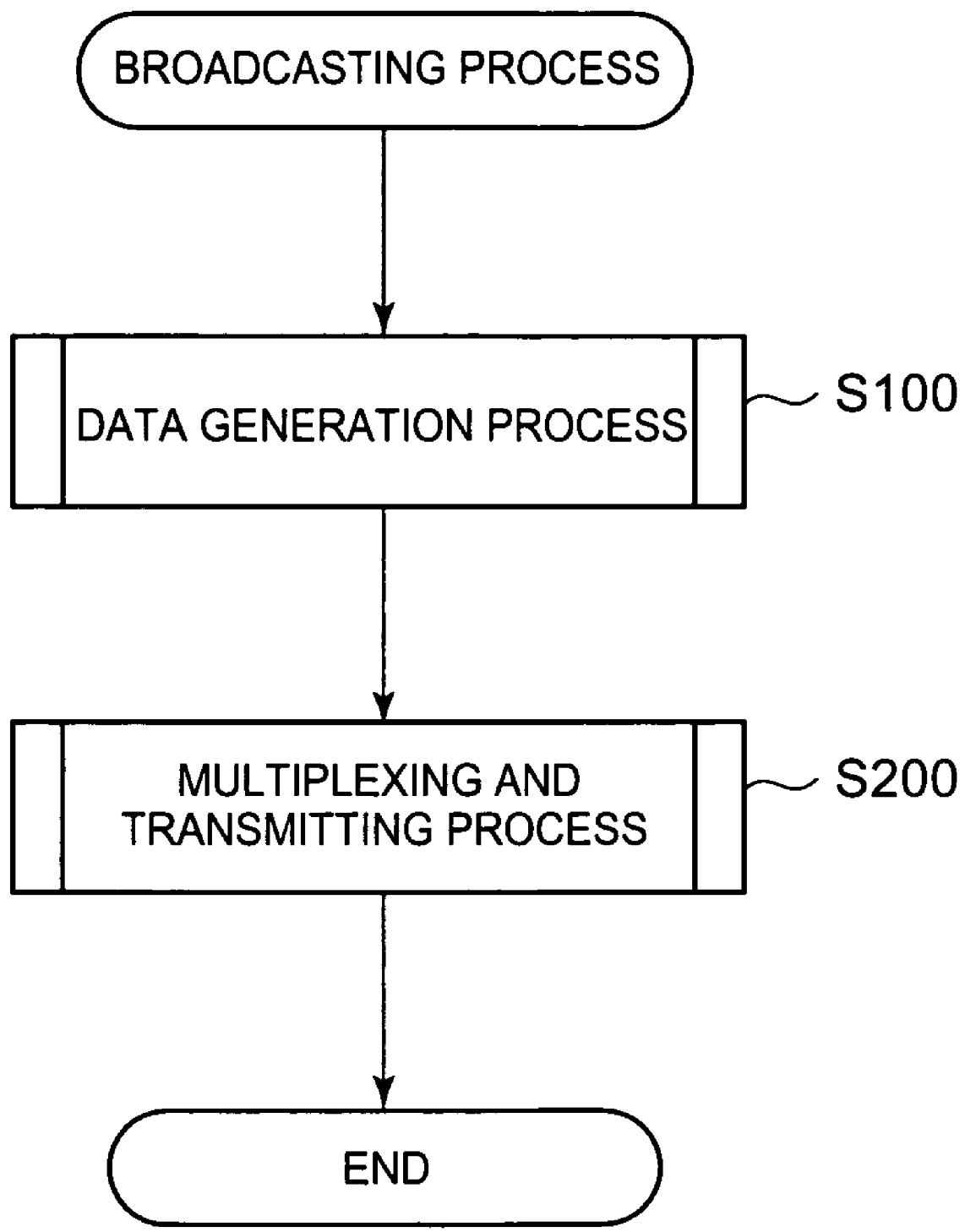
FIG. 7 is a flowchart for explaining a broadcasting process according to the embodiment 1 of the present invention.

As shown in FIG. 7, in the broadcasting process performed by the broadcasting apparatus 100, to be performed are a "data generation process" (step S100) for generating a data stream representing the content to be broadcast, and a "multiplexing and transmitting process" (step S200) for multiplexing a decoding program on the data stream generated in the data generation process and transmitting the resultant data stream. For example, this broadcasting process is started as triggered when an instruction for starting broadcasting of a content is input to the broadcasting apparatus 100.

Figure 8:
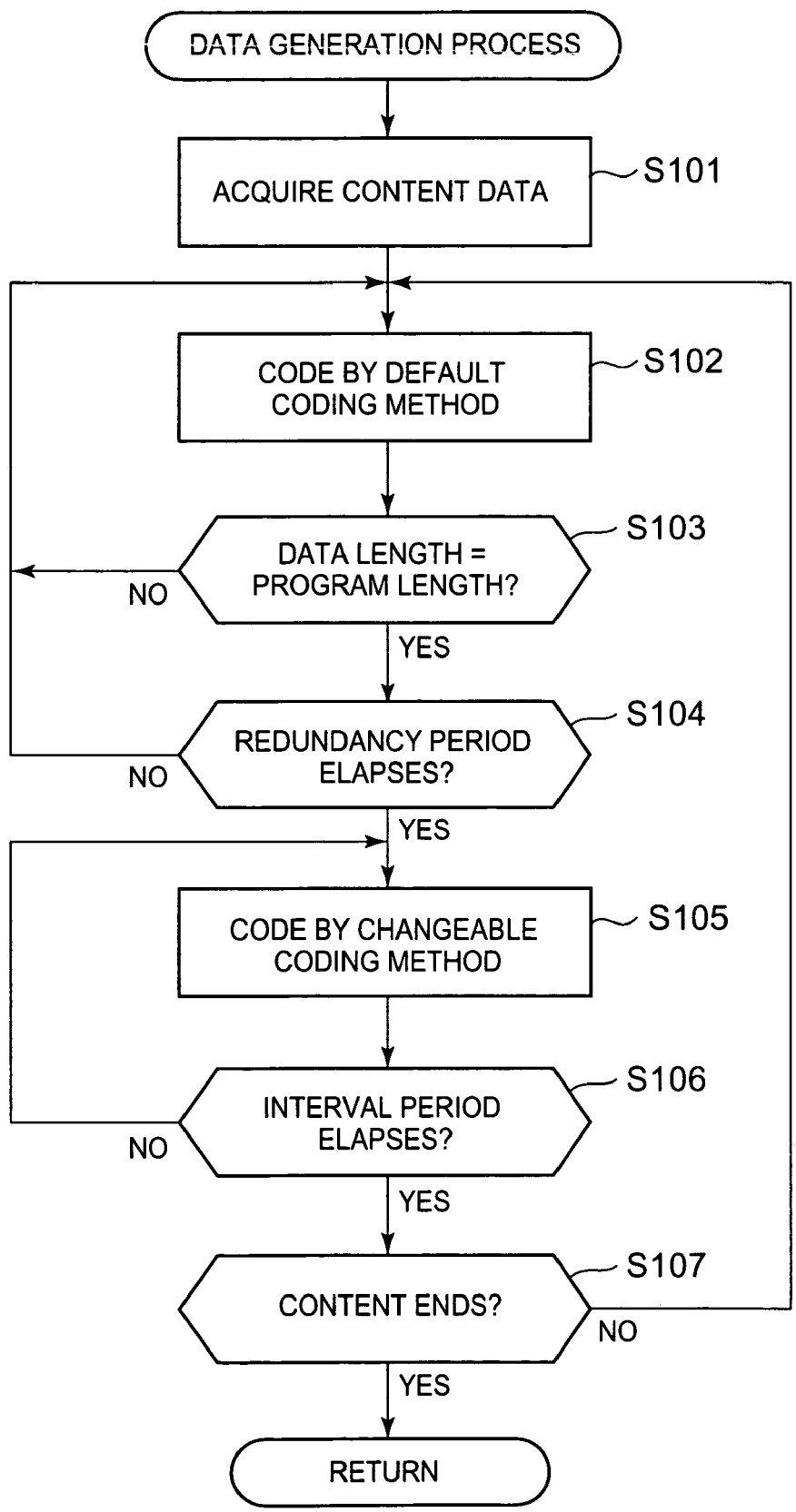
FIG. 8 is a flowchart for explaining a data generation process.

First, the data generation process for generating a data stream to be broadcast will be explained with reference to the flowchart shown in FIG. 8. This data generation process is a process performed by the data generation unit 120 of the broadcasting apparatus 100, and is started when content data is supplied from the content acquiring unit 110 to the data generation unit 120. According to the present embodiment, inclusion of audios and videos in the content is assumed. This raises necessity for different coding processes for the videos and audios respectively. However, to facilitate understanding, the coding process for the videos (motion pictures) will mainly be explained on the present embodiment.

When the process is started, the content data acquiring unit 121 of the data generation unit 120 acquires the content data supplied from the content acquiring unit 110 in the unit of frames (step S101), and sends it to the coding method selection unit 122 as it acquires a frame.

The coding method selection unit 122 selects a coding method for the content data supplied from the content data acquiring unit 121 in the unit of frames. Immediately after this process is started, that is, in the starting period of the content, the coding method selection unit 122 selects the default coding method.

The coding method selection unit 122 sends the frame data supplied thereto after it selects the default coding method, to the first content coding unit 123. The first content coding unit 123 codes the frame supplied from the coding method selection unit 122 by the default coding method to generate first coded data (hereinafter referred to as "coded data D1") (step S102). The first content coding unit 123 sequentially sends the generated first coded data D1 to the data stream generation unit 125.

After the default coding method is selected by the coding method selection unit 122 and the coded data D1 is generated by the first content coding unit 123, the coding method selection unit 122 determines whether the data length of the coded data D1 has reached the data length ΔP of the decoding program to be multiplexed in the later-described multiplexing and transmitting process (step S103).

The process of step S102 is repeated until the data length of the coded data D1 reaches the program length ΔP of the decoding program (step S103: No), so generation of the coded data D1 will be continued.

When the data length of the generated coded data D1 reaches the program length ΔP of the decoding program (step S103: Yes), the coding method selection unit 122 starts measuring the time from that timing (referred to as timing Ti). Then, the coding method selection unit 122 determines whether a predetermined redundancy period ΔR has elapsed or not (step S104).

The redundancy period ΔR is a period of time required for the decoding program, which is to be multiplexed on the content data, to be applied (i.e., installed) to the reproducing apparatus 200 (hereinafter this period of time will be referred to as "required application time"). The required application time is calculated based on the program length of the decoding program to be multiplexed.

The process of step S102 will be repeated until the redundancy period ΔR elapses from the timing T1 (step S104: No), so the generation of the coded data D1 will be continued.

When the redundancy period ΔR elapses from the timing T1 (step S104: Yes), the coding method selection unit 122 selects the changeable coding method at that timing (referred to as timing T2). That is, the coding method selection unit 122 switches the coding method from the default coding method to the changeable coding method.

The coding method selection unit 122 sends the frame data supplied thereto after it selects the changeable coding method, to the second content coding unit 124. The second content coding unit 124 codes the frame data supplied from the coding method selection unit 122 by the changeable coding method to generate second coded data (hereinafter referred to as "coded data D2") (step S105). The second content coding unit 124 sequentially sends the generated coded data D2 to the data stream generation unit 125.

When the generation of the coded data D2 is started by the second content coding unit 124 at step S105 with the changeable coding method selected, the coding method selection unit 122 arranges for the process of step S105 to be repeated so that the generation of the coded data D2 will be continued until a predetermined interval period ΔI elapses from the timing T2 (step S106: No).

When the predetermined interval period ΔI elapses from the timing T2 (step S106: Yes), the coding method selection unit 122 determines whether the content has ended (step S107). At this step, the coding method selection unit 122 determines the end of the content by determining whether the content data supplied from the content data acquiring unit 121 has ended.

In a case where the content has not yet ended (step S107: No), the flow returns to step S102, so that coding by the default coding method will be performed. That is, the coding method selection unit 122 selects the default coding method if the period in which the coded data D2 is being generated exceeds the predetermined interval period ΔI and there is still content data to be coded. Thus, the content data to arrive after the timing he interval period ΔI is exceeded (this timing will be referred to as timing T3) will be supplied to the first content coding unit 123 to be coded by the default coding method. that is, when coding by the changeable coding method continues for a predetermined period, the coding method is switched to the default coding method.

Figure 10:
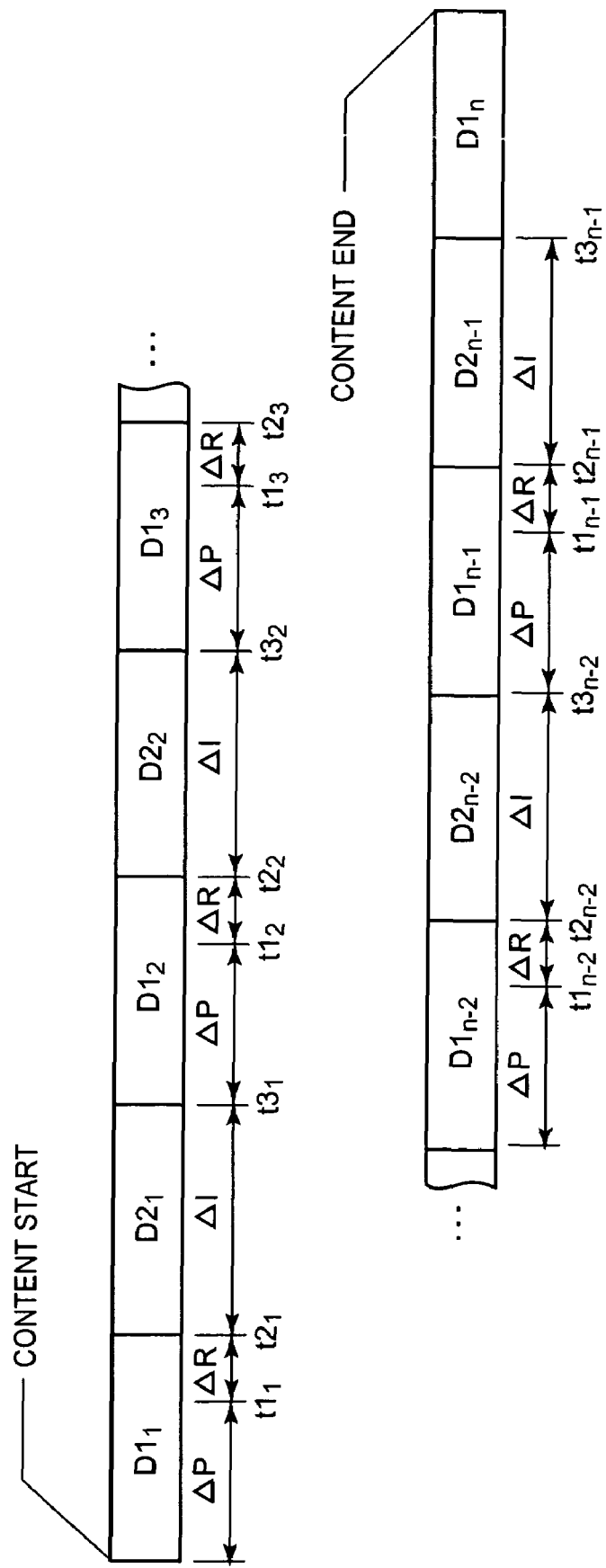
FIG. 10 is a diagram showing the data structure of a data stream generated in the data generation process.

After this, until the end of the content is detected at step S107, the processes of the above steps S102 to S106 will be repeated. That is, the content data is coded while the default coding method and the changeable coding method are switched to each other based on the program length ΔP of the decoding program to be multiplexed, the redundancy period ΔR, and the predetermined interval period ΔI, generating the data structure as shown in FIG. 10.

In order for such a data structure will be obtained, the coded data are supplied from the first content coding unit 123 and from the second content coding unit 124 to the data stream generation unit 125. The data stream generation unit 125 generates a data stream representing the contents by dividing the coded data supplied form the first content coding unit 123 and the second content coding unit 124 into packets and arranging the packets.

The packets building up the data stream generated by the data stream generation unit 125 will be explained. Hereinafter, the packets of the coded data D1 will be referred to as "packet C1", and the packets of the coded data D2 will be referred to as "packet C2".

Figure 11A:
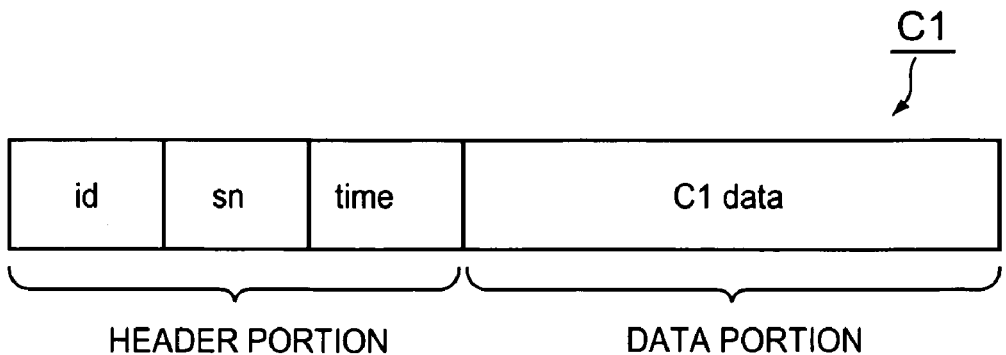
FIGS. 11A to 11C are diagrams for explaining packets generated in the data generation process, where

The structure of a packet C1 will be explained with reference to FIG. 11A. As shown in FIG. 11A, the packet C1 has a header to serve as ID information added to the body of the coded data "C1DATA". The header to be added to the packet C1 includes, for example, "ID" indicating the packet type, "SN" indicating a serial number assigned among packets of each type, "TIME" which is a time stamp to be used for time synchronization, etc.

Figure 11B:
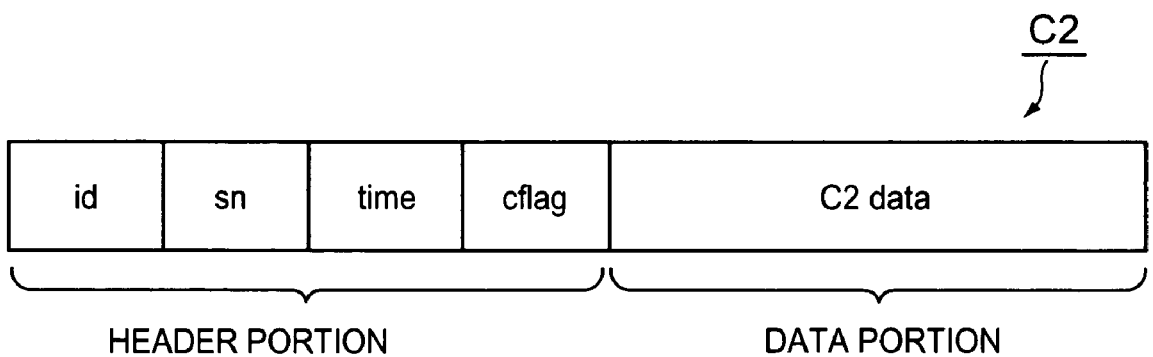

The structure of a packet C2 will be explained with reference to FIG. 11B. As shown in FIG. 11B, the packet C2 has a header to serve as ID information added to the body of the coded data "C2DATA". The header to be added to the packet C2 includes "ID", "SN", "TIME", etc. likewise the header of the packet C1, and also includes "CFLAG" which is a flag indicating compatibility. A value indicating compatibility between the packet C2 concerned and the default coding method is recorded on "CFLAG". For example, "0" is set as the flag value (CFLAG=0) in a case where there is no compatibility between the packet C2 and the default coding method, and a flag value "1" is set (CFLAG=1) in a case where there is compatibility between them.

The cases of no compatibility includes a case where the packet C2 (coded data D2) cannot be decoded by a decoding operation based on the default coding method, and also a case where there is so great a mismatch between a result of local decoding in the coding process by the second content coding unit 124 and a reference image obtained from the previous decoding by the reproducing apparatus 200 that the local decoding result of the second content coding unit 124 cannot substantially be used. In such cases, a flag value "0" is set to "CFLAG". In the other cases, that is, in the cases where the packet C2 (coded data D2) can be decoded by a decoding operation based on the default coding method and the mismatch is not so large, a flag value "1" is set.

Further, in a case where the units of motion compensation are different but the grammars of the parameter coded are the same like the case of the default coding method (½ pel method) and the changeable coding method (¼ pel method) exemplified in the present embodiment, if the absolute values of the motion might differ from each other, the flag value is set to "0". For example, in a case where the grammars of the parameter coded are compatible in a more upward layer and the least significant bit of the motion in the ¼ pel unit can be decoded safely as another grammatical element than that parameter, the mismatch is not so large even if the decoding results are different, and the flag value is therefore set to "1".

The flag values to be set as the compatibility information need not be constants, but may be adaptively set. For example, in a case where there are two decoding algorithms and the decoding results of these algorithms would possibly have a mismatch between them but in many cases the error would not be so large, the data generation unit 120 evaluates the size of the error, sets "0" to the flag value if the error is large, and sets "1" to the flag value if the error is not large.

When a data stream is generated using packets having such structures, the data generation process is completed, returning to the broadcasting process flow shown in FIG. 7.

Figure 9:
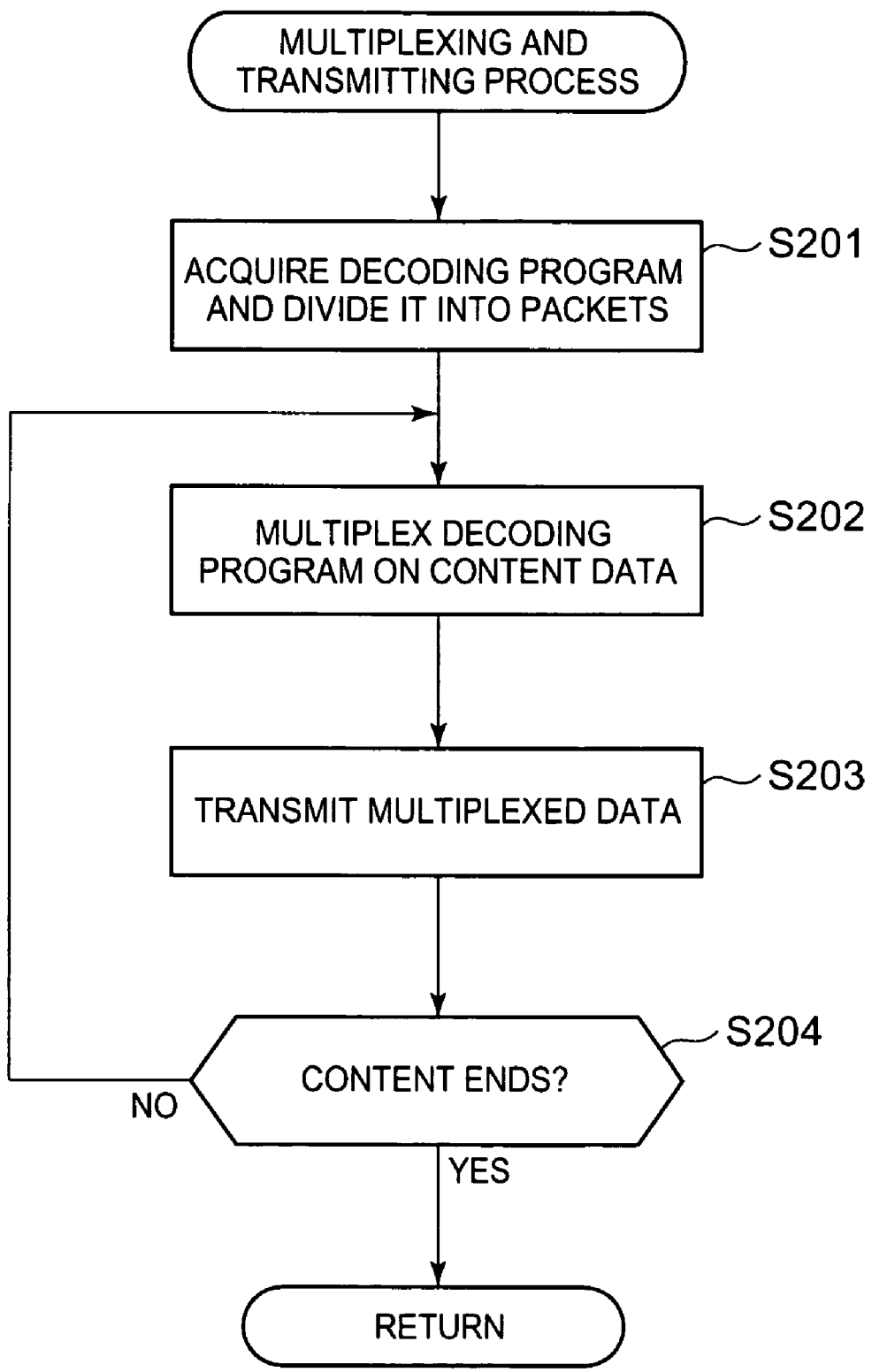
FIG. 9 is a flowchart for explaining multiplexing and transmitting process.

In the broadcasting process, the "multiplexing and transmitting process" for multiplexing a program on the data stream generated in the data generation process and transmitting the data stream will be performed (step S200). The multiplexing and transmitting process will now be explained with reference to the flowchart shown in FIG. 9.

When the data stream of the content is generated in the data generation process, the data stream generation unit 125 sequentially sends the generated data stream to the output unit 130. The data stream acquiring unit 131 of the output unit 130 acquires the data stream from the data stream generation unit 125, and upon this acquisition, the multiplexing and transmitting process is started. When the process is started, the data stream acquiring unit 131 sends the acquired data stream to the multiplexing unit 133.

Upon acquiring the data stream from the data stream acquiring unit 131, the multiplexing unit 133 starts acquiring a decoding program to be multiplexed from the decoding program storage unit 132, and sequentially divides the acquired decoding program into packets (step S201).

Figure 11C:
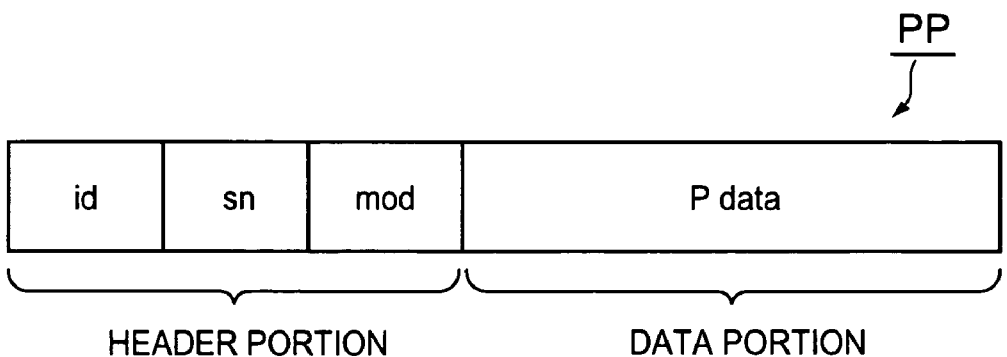

The packet of the decoding program to be generated in this manner (hereinafter referred to as "packet PP") will be explained with reference to FIG. 11C. FIG. 11C is a diagram showing the data structure of the packet PP. As shown in FIG. 11C, the packet PP has a header serving as ID information added to the decoding program body "PDATA" as divided. The header added to the packet PP includes, for example, "ID" indicating the packet type, "SN" indicating a serial number assigned among packets of each type, "MOD" indicating the type of the decoding program concerned, etc. "SN" includes the serial number of the packet and additionally includes ID information "LP" if the packet is the last packet.

"MOD" includes, for example, ID information indicating the coding mode to which the decoding program included in the packet concerned corresponds, the process content, the type of the program, etc. In this case, a predetermined value is recorded on "MOD", where information indicating the type, etc. is assigned to each such predetermined value. For example, assuming that the "MOD" values vary from 0 to 5, the process contents, program types, etc. are assigned as "0: inter-prediction process", "1: intra-prediction process", "2: residual error decoding process", "3: in-loop filter", "4: post-filter", and "5: entire decoding", for example. The reproducing apparatus 200 determines the type of the received program, the timing of execution of the program, etc. based on such ID information. The number and format of the ID information are arbitrary, and not limited to the above.

Then, the multiplexing unit 133 multiplexes the decoding program on the data stream of the content by orderly arranging the packets (packets C1 and packets C2) building up the data stream of the content acquired from the data stream acquiring unit 131 and the packets PP.

To be more specific, the multiplexing unit 133 arranges the packets C1 included in the data stream, i.e., the packets of the data coded by the default coding method, together with the packets PP in order to multiplex them (step S202). As described above, the generated data stream of the content has been coded by the default coding method and the changeable coding method alternately. The multiplexing unit 133 multiplexes the packets PP sequentially from the top of each coded data D1 of the data stream having this structure.

Figure 12A:
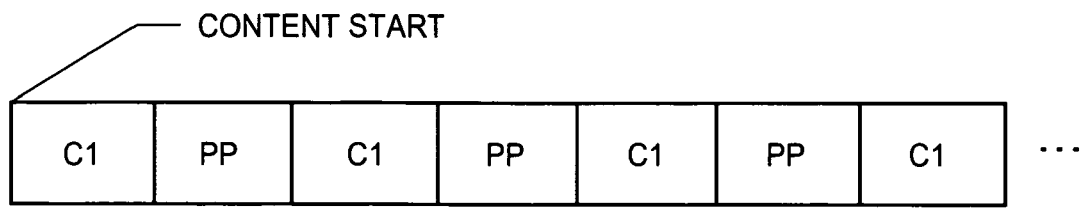
FIGS. 12A to 12C are diagrams for explaining multiplexing in the multiplexing and transmitting process, where

The beginning of the content has been coded by the default coding method. Therefore, the multiplexing unit 133 multiplexes the packet PP from the beginning of the content. In this case, the multiplexing unit 133 arranges the packets C1 and the packets PP alternately as shown in FIG. 12A.

Figure 12B:
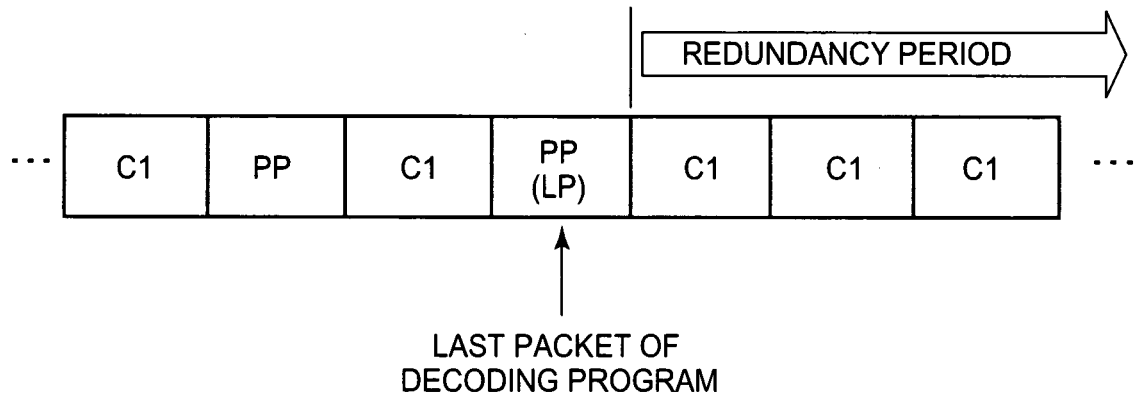

As described above, since content data corresponding in length to the program length ΔP of the decoding program to be multiplexed has been coded by the default coding method, such a data structure as shown in FIG. 12B is generated when multiplex of all the packets PP of the objective decoding program is completed. That is, the packets C1 and the packets PP are arranged alternately until before the last packet among the packets PP, that is denoted by the ID information LP indicative of it being the last packet. Furthermore, as described above, since decoding by the default coding method has continuously been performed during a period corresponding to the redundancy period ΔR after decoding by the default coding method has been performed during a period corresponding to the program length ΔP, packets C1 are continuously arranged over such a length as corresponding to the redundancy period ΔR after the last packet of the decoding program, as shown in FIG. 12B.

Figure 12C:
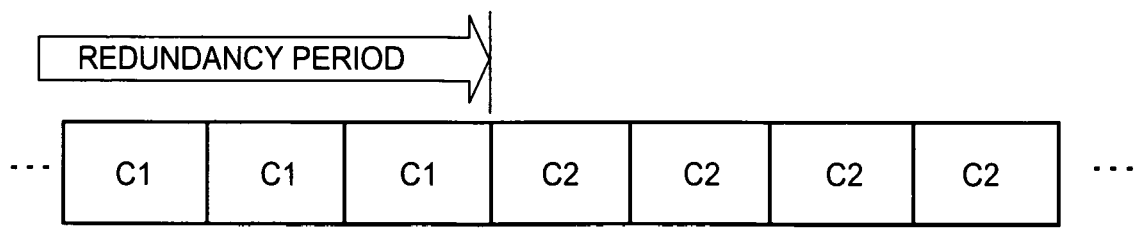

Thereafter, the packets C2 succeed as shown in FIG. 12C, because coded data D2 has been generated after the redundancy period ΔR elapsed.

In this manner, the multiplexing unit 133 sequentially sends the data stream in which the decoding program has been multiplexed on the part of the coded data D1, to the transmitting unit 134. The transmitting unit 134 sequentially outputs the decoding program-multiplexed data stream, thereby simultaneously transmitting the content data representing a television program or the like and the decoding program (step S203). In this case, the decoding program is transmitted at the time the data (coded data D1) having been coded by the default coding method is transmitted.

This multiplexing and transmitting process is repeated until the content ends (step S204: No). That is, the multiplexing unit 133 multiplexes the decoding program from the respective tops of the coded data D1, which are to appear plural times in the data stream, and the transmitting unit 134 sequentially transmits the data stream on which the decoding program has been multiplexed in this manner.

The process ends (step S204: Yes) when the content comes to an end, returning to the flow of the broadcasting process shown in FIG. 7. In the broadcasting process, all the steps have been completed upon the completion of transmission in the multiplexing and transmitting process.

As explained above, in the broadcasting process performed by the broadcasting apparatus 100, a data stream in which the content data is coded by a plurality of coding methods (the default coding method and the changeable coding method) is generated. Since the data stream of the content is transmitted with a decoding program multiplexed thereon, the decoding program is transmitted simultaneously with the content. And since the decoding program is multiplexed on the parts where the data is coded by the default coding method, the decoding program will be transmitted at the same time the data coded by the default coding method is transmitted, allowing the decoding program to be transmitted plural times during the transmission of the content.

This enables the reproducing apparatus 200 which is not adapted to the changeable coding method, to decode and reproduce the data coded by the default coding method on one hand when it receives such a television broadcast, while downloading the multiplexed decoding program on the other hand. During the redundancy period ΔR set after the timing the multiplex of the decoding program is completed, the reproducing apparatus 200 receives data coded by the default coding method, thereby enabled to reproduce the content also while it is installing the downloaded decoding program.

The content data building up the data stream switches from the changeable coding method to the default coding method each time the predetermined interval period ΔI elapses. Therefore, even if a reproducing apparatus 200 which is not adapted to the changeable coding method starts receiving data at a part where data is coded by the changeable coding method, it will thereafter receive data coded by the default coding method and will thus become able to start reproducing. That is, by setting an appropriate interval period ΔI, it is possible to shorten the latency.

Figure 14:
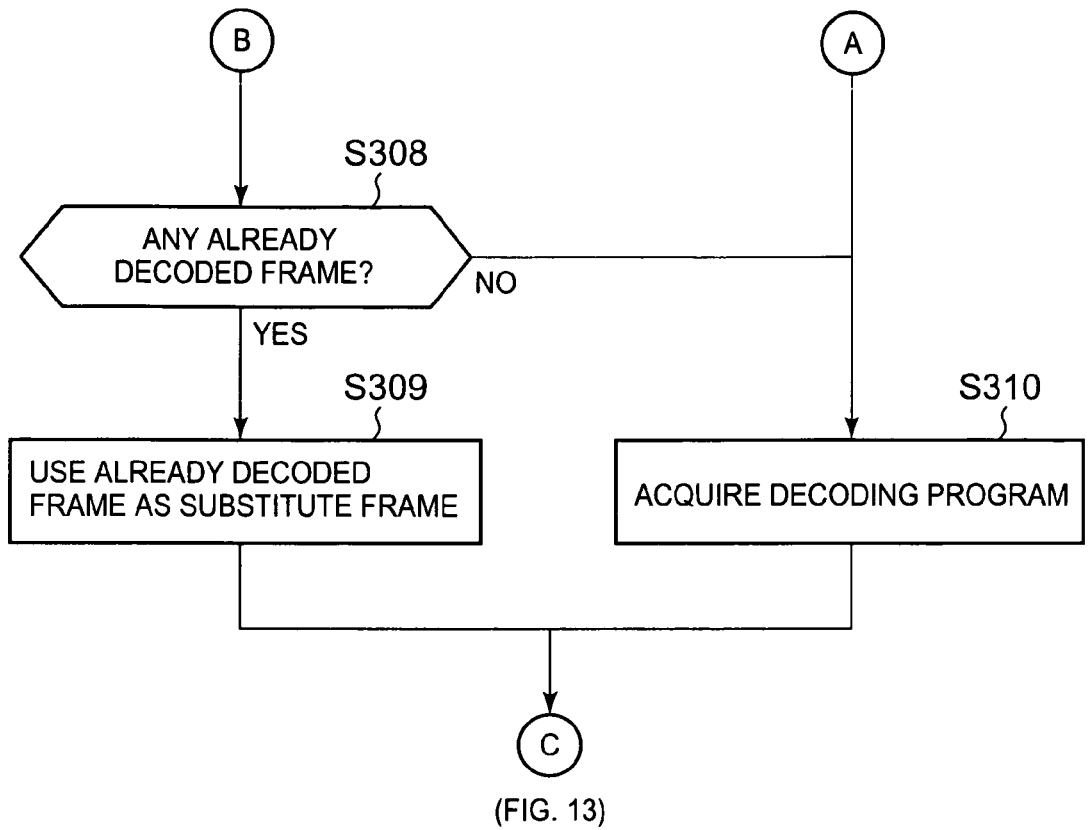
FIG. 14 is a flowchart for explaining the decoding and reproducing process according to the embodiments of the present invention.

Next, a process for reproducing the content to be performed by the reproducing apparatus 200 having received the data stream generated and transmitted in the broadcasting process, will be explained. According to the present embodiment, the reproducing apparatus 200 receives and reproduces the data stream which the broadcasting apparatus 100 has transmitted via digital television broadcasting. A "decoding and reproducing process" to be performed by the reproducing apparatus 200 will now be explained with reference to the flowchart shown in FIG. 13 and FIG. 14. This decoding and reproducing process will be started upon the activation of the reproducing apparatus 200, for example. The reproducing apparatus 200 according to the present embodiment is adapted to the default coding method (½ pel method) in its initial state, but is not adapted to the changeable coding method (¼ pel method).

When the process is started, the receiving unit 210 of the reproducing apparatus 200 receives the radio wave of the digital television broadcast transmitted by the broadcasting apparatus 100, sequentially entering the data stream superposed on the carrier wave to the decoding unit 220. That is, the decoding unit 220 acquires the packets building up the data stream, and sequentially inputs the packets to the data determination unit 221 (step S301).

The data determination unit 221 determines whether the input packet is either a packet C2 or a packet PP (step S302). In a case where the input packet is a packet C1 (step S302: No), the data determination unit 221 supplies this packet C1 to the content decoding unit 222. The content decoding unit 222 decodes the supplied packet C1 by a decoding process corresponding to the default coding method (step S307). The content decoding unit 222 sends the decoded data to the DAC 230, thereby the content part coded by the default coding method will be reproduced.

To the contrary, in a case where the input packet is either a packet C2 or a packet PP (step S302: Yes), the data determination unit 221 refers to the header information of this packet to identify the corresponding coding method (step S303). According to the present embodiment, since a packet C2 is coded by the changeable coding method and a decoding program corresponding to the changeable coding method is multiplexed, the reference to the header information of the packet C2 or the packet PP will reveal that the corresponding coding method is the changeable coding method (¼ pel method).

When the data determination unit 221 identifies the coding method, the program control unit 223 determines whether the decoding unit 220 is un-adapted or not to the identified coding method (i.e., the changeable coding method) (step S304). In this step, the program control unit 223 determines whether the decoding unit 220 is adapted to the changeable coding method, by finding out a coding method that corresponds to a decoding program stored in the program storage unit 224. According to the present embodiment, since the decoding unit 220 of the reproducing apparatus 200 is not adapted to the changeable coding method in its initial state, it is determined un-adapted to the identified changeable coding method (step S304: Yes).

In this case, the data determination unit 221 determines whether the input packet is a packet C2 or not (step S305). In a case where the packet is a packet C2 (step S305: Yes), the data determination unit 221 supplies this packet C2 to the content decoding unit 222.

The content decoding unit 222 refers to the header "CFLAG" of the packet C2 supplied from the data determination unit 221 to determine whether this packet C2 is compatible with the decoding process corresponding to the default coding method (step S306). That is, the packet C2 is compatible if the flag value of the header "CFLAG" is "1" while it is incompatible if the flag value is "0".

In a case where the packet C2 is compatible with the default coding method (step S306: Yes), the content decoding unit 222 decodes the packet C2 supplied from the data determination unit 221 by performing a decoding process corresponding to the default coding method (step S307).

To the contrary, in a case where the packet C2 is incompatible with the default coding method (step S306: No), the content decoding unit 222 determines whether there exists any already decoded frame of the data stream now being decoded (step S308 in FIG. 14).

In a case where there is any already decoded data (step S308: Yes in FIG. 14), the content decoding unit 222 copies the frame decoded immediately before as a substitute frame, and sends the data of this substitute frame to the DAC 230. This makes the content part corresponding to this packet C2 reproduced based on the substitute frame decoded immediately before this packet C2 (step S309 in FIG. 14).

To the contrary, in a case where there is no decoded frame because, for example, the input packet C2 is a packet at the time the data reception is started (step S308: No in FIG. 14), the content decoding unit 222, for example, rejects the packet C2, and waits for a packet PP of the decoding program corresponding to the changeable coding method to come to acquire the decoding program (step S310 in FIG. 14).

In a case where the decoding unit 220 is un-adapted to the changeable coding method (step S304: Yes) and the input packet is a packet PP (step S305: No), the data determination unit 221 supplies the input packet PP to the program control unit 223. The program control unit 223 acquires the decoding program multiplexed on the data stream by arranging the packets PP sequentially supplied thereto from the data determination unit 221 in the original order based on the serial number of the header "SN" (step S310 in FIG. 14). The program control unit 223 stores the decoding program acquired in this manner in the program storage unit 224.

The data determination unit 221 repeats the above-described steps until the data stream to be acquired ends (step S311: No). After the decoding program is acquired in step S310 and installed in the program storage unit 224, the decoding unit 220 has become adapted to the changeable coding method.

In this case, the data determination unit 221 determines that the decoding unit 220 is not un-adapted to the changeable coding method (step S304: No), and supplies the input packet C2 to the content decoding unit 222. The content decoding unit 222 executes the decoding program corresponding to the changeable coding method, thereby decoding the packet C2 by a decoding process corresponding to the changeable coding method (step S312). The content decoding unit 222 sends the data of the packet C2 as decoded to the DAC 230, and the content part corresponding to the data coded by the changeable coding method is reproduced.

The decoding and reproducing process is completed when the data stream ends (step S311: Yes).

As explained above, by performing the decoding and reproducing process, the reproducing apparatus 200 can acquire the decoding program while reproducing the content, and after acquiring the decoding program, can decode the data by a decoding process corresponding to the new coding method. Therefore, even if the reproducing apparatus 200 is not adapted to the changeable coding method, it can start reproducing the content after a very short latency and become able to deal with the changeable coding method while continuing the reproduction.

According to the present embodiment, the content to be broadcast via digital television broadcasting is coded by the default coding method and the changeable coding method, and the decoding program corresponding to the changeable coding method is transmitted at the time the data coded by the default coding method is transmitted. Because of this, when a reproducing apparatus 200 un-adapted to the changeable coding method receives the data stream, it can smoothly decode and reproduce the data coded by the default coding method and also can acquire the decoding program corresponding to the changeable coding method during the reproduction. Further, since a redundancy period corresponding to a period of time required for applying the decoding program to the reproducing apparatus 200 is set and the data is coded by the default coding method during this redundancy period, the reproduction of the content is not to be interrupted while the decoding program corresponding to the new coding method is being installed on the reproducing apparatus 200.

In case of television broadcasting, it is not necessarily the case that the reproducing apparatus 200 receives the content from its very beginning. That is, there is some case that the reproducing apparatus 200 un-adapted to the changeable coding method starts receiving the data from a data part coded by the changeable coding method. Even in such a case, data coded by the default coding method will appear repeatedly, allowing the reproducing apparatus 200 to start reproducing the content after a relatively short latency. Furthermore, since the decoding program is transmitted plural times repeatedly correspondingly to the data parts coded by the default coding method, the reproducing apparatus 200 can acquire the decoding program to render itself suitable for the changeable coding method at anytime even if it starts receiving the content from its middle part.

Embodiment 2

According to the Embodiment 1, a plurality of data parts coded by the default coding methods are prepared in one data stream, by coding the data by the default coding method when a predetermined interval period elapses. However, the timing at which the coding method is switched to the default coding method is not limited to when the above-mentioned interval period elapses.

For example, the data may be coded by the default coding method in response to the changes in the coding modes. That is, the intra-frame differential coding method includes intra-prediction coding mode and the inter-prediction coding method. It is possible to reduce the latency more effectively by coding frames suitable for intra-prediction coding mode by the default coding method.

That is, for example, the intra-prediction coding mode is selected for a key frame for which an appropriate reference frame cannot be obtained due to a scene change or the like entailing a much change of the image. Therefore, in a case where the intra-prediction coding mode is selected while the content is being coded by the changeable coding method, switching the coding method from the changeable coding method to the default coding method enables even a reproducing apparatus 200 un-adapted to the changeable coding method to shorten the latency without greatly deteriorating the reproduction quality.

In a case where the coding modes are switched in this manner, the data part where such mode switching occurs may be coded both by the default coding method and the changeable coding method. That is, the same single frame (picture) may be coded by plural types of coding methods. This allows a reproducing apparatus 200 already adapted to the changeable coding method to continue decoding without switching the decoding processes when the coding modes are switched.

Further, for example, in a case where data coded by the changeable coding method lasts for a long period of time, a frame coded by the default coding method may be inserted in such data periodically. In this case, the data stream generation unit 125 detects the period in which the packets C2 continue, while it generates the data stream. The data stream generation unit 125 detects that the packets C2 continue longer than a predetermined period, by measuring the time in which the packets C2 continue. Alternatively, for example, it may detect that the packets C2 continue longer than a predetermined period, based on the number of packets C2 arranged. Then, in a case where the data stream generation unit 125 detects that the data coded by the changeable coding method continue longer than a predetermined period, it notifies this to the coding method selection unit 122. In response to this, the coding method selection unit 122 selects the default coding method and supplies the acquired content data to the first content coding unit 123.

Note that the coding method selection unit 122 may select both of the default coding method and the changeable coding method and supply the content data of the same frame to the first content coding unit 123 and the second content coding unit 124, so that a data stream including data obtained by coding the same frame by plural types of coding methods may be generated.

With such an operation, data coded by the default coding method is inserted in the data in a case where data coded by the changeable coding method continue for a long time. Because of this, even a reproducing apparatus 200 un-adapted to the changeable coding method can continue reproducing without greatly reducing the reproduction quality, by decoding the inserted frame coded by the default coding method as a substitute frame.

In a case where a data stream in which the same frame is coded by plural types of coding methods is generated, the reproducing apparatus 200 can decode the data by appropriately selecting between plural types of decoding methods for the same single frame, and therefore can reproduce the content with a sufficient quality even when it cannot have the program installed thereon due to, for example, frequent fast forwarding play or broadcasting channel switching.

Embodiment 3

According to the above-described embodiments, the broadcasting apparatus 100 transmits the decoding program plural times repeatedly while it is transmitting the content. The occupation rate per unit time of the decoding program in the data stream may be varied in accordance with the number of times the decoding program has been transmitted.

That is, according to the above-described embodiments, the decoding program is multiplexed on the content data by being divided into packets. By varying the packet size of the decoding program in accordance with the number of transmission times, it is possible to restrict the amount of redundant coding and to increase the compression efficiency.

In this case, the multiplexing unit 133 of the broadcasting apparatus 100 counts the number of times the decoding program has been multiplexed (that is, the number of times the decoding program has been transmitted) when it is multiplexing the decoding program on the data stream of the content. Based on this number, the multiplexing unit 133 multiplexes the decoding program by dividing it into packets of a normal packet size for the first multiplexing. Then, for the second multiplexing and thereafter, the multiplexing unit 133 multiplexes the decoding program by dividing it into packets of a smaller size (for example, ½) than the packet size for the first multiplexing.

By varying the packet size of the decoding program to be multiplexed in accordance with the number of times of transmission, it is possible to appropriately control the amount of coding of the data to be transmitted. In the case where the packet size of the decoding program is varied, the length of the redundancy period ΔR is also appropriately set in accordance with the packet size.

Further if the packet size of the decoding program is variable, it is possible to set the packet size fixedly to the number of times of transmission, and also possible to set the packet size dynamically. In this case, for example, the packet size can be set dynamically in accordance with the content of the succeeding content data. For example, in a case where the succeeding data coded by the changeable coding method is incompatible with the default coding method (that is, in a case where the header of the packets C2 building up that coded data D2 indicates "CFLAG=0"), the packet size of the decoding program to be multiplexed is set to the normal one. On the other hand, in a case where the succeeding coded data D2 is compatible with the default coding method ("CFLAG=1"), the packet size of the decoding program is set smaller than the normal packet size. Accordingly, while the reproducing apparatus 200 is receiving coded data D2 (packets C2) that can be decoded also by the default coding method, the reproducing apparatus 200 can prioritize the decoding process so that the decoding process will be completed before the period of time in which the decoding program is downloaded ends. This makes it possible to parallelize the downloading of the decoding program.

Embodiment 4

Figure 15:
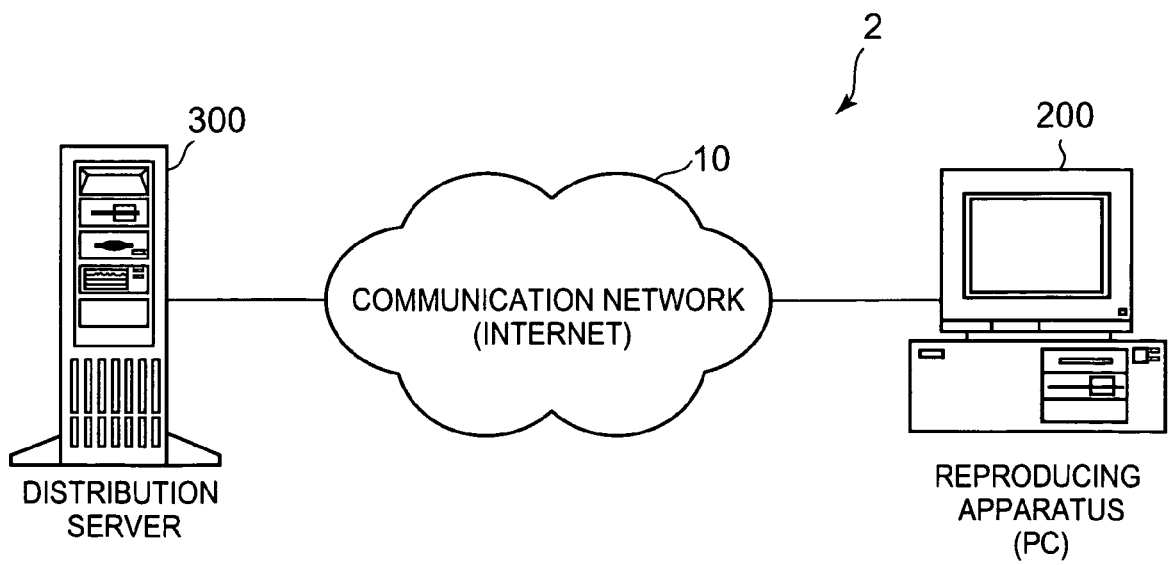
FIG. 15 is a diagram exemplarily showing the configuration of a distribution system according to the embodiment 4 of the present invention.

According to the above-described embodiments, a case has been illustrated where the present invention is applied to the television broadcasting. However, the present invention can also be applied to an embodiment where a motion picture file is streaming-reproduced via a communication network such as the Internet. In this case, the present invention can be applied to a distribution system 2 as shown in FIG. 15, comprising a distribution server 300 for distributing motion picture files and a reproducing apparatus 200, which are connected to each other via a communication network 10 such as the Internet.

In this case, the reproducing apparatus 200 is constituted by a computer apparatus such as a personal computer (PC). The distribution server 300 is constituted by a computer apparatus such as, for example, a mainframe, a workstation, a personal computer, etc., and transmits (distributes) a motion picture file to a reproducing apparatus 200 in response to a request from this reproducing apparatus 200.

In such an embodiment, the distribution server 300 has a similar configuration to the data generation unit 120 shown in the above-described embodiments, and generates a data stream of a content as described above. A separate apparatus having the configuration and functions of the data generation unit 120 may be prepared. In this case, a data stream generated by such a separate apparatus may be provided to the distribution server 300.

According to the present embodiment, the distribution of a content is started in response to a request from a user. Therefore, unlike the broadcasting cases shown in the above-described embodiment 1 to 3, the assumption that the content might be started to be watched in the middle of its sequence is not necessary. That is, the distributed motion picture content is necessarily reproduced from its beginning.

Accordingly, the data generation unit 120 needs not to repeatedly transmit the decoding program plural times while it is transmitting the content as in the above-described embodiments. That is, when generating a data stream, the data generation unit 120 starts coding the content data by the default coding method, also starts multiplexing the decoding program, and continues coding the content data by the default coding method until the redundancy period ΔR set after the multiplexing of the decoding program elapses. Then, after the redundancy period ΔR elapses, the data generation unit 120 codes the content data by the changeable coding method until the sequence ends.

That is, multiplexing of the decoding program is needed only at the starting part of the sequence. Because of this, it is possible to restrict the amount of coding required in the entire sequence. Further, since it is not necessary to switch the coding methods in accordance with a scene change, etc., the data generation process can be simplified.

By comprising the same configuration as the decoding unit 220 shown in the embodiment 1 to 3, also the reproducing apparatus 200 according to the present embodiment acquires the decoding program multiplexed on the data stream supplied via the communication network 10 while it is reproducing the data stream. Then, after acquiring the decoding program, the decoding unit 220 executes the acquired program, thereby decoding the content data coded by the changeable coding method.

The reproducing apparatus 200 according to the present embodiment is constituted by a computer apparatus such as a personal computer, and therefore each function of the decoding unit 220 is realized by software processing. In this case, for example, a control program for realizing the process performed by the decoding unit 220 shown in the embodiment 1 is stored in a storage device such as a-hard disk, and a computing/control device constituted by a CPU (Central Processing Unit) or the like executes the control program, thereby the same operation as that of the decoding unit 220 described above can be realized.

The method for providing such a control program is arbitrary. For example, needless to say, such a program may be provided via a communication medium such as the Internet, or it may be provided stored in a recording medium such as a CD-ROM, a DVD, etc.

Alternatively, the decoding unit 220 may be realized by hardware processing by means of an extender board or the like. In this case, for example, the decoding unit 220 may be constituted by an FPGA on which a control program can be updated.

Embodiment 5

According to the above-described embodiments, the content data and the decoding program are provided to the reproducing apparatus 200 through the same route by the decoding program being multiplexed on the content data. However, the decoding program may be provided through a different route from the content data. In this case, for example, the decoding program may be provided via a communication network 10 such as the Internet.

Thus, the reproducing apparatus 200 according to the present embodiment comprises a configuration for enabling the apparatus 200 to connect to the communication network 10, in addition to the function for receiving the data stream of the content data.

Figure 16A:
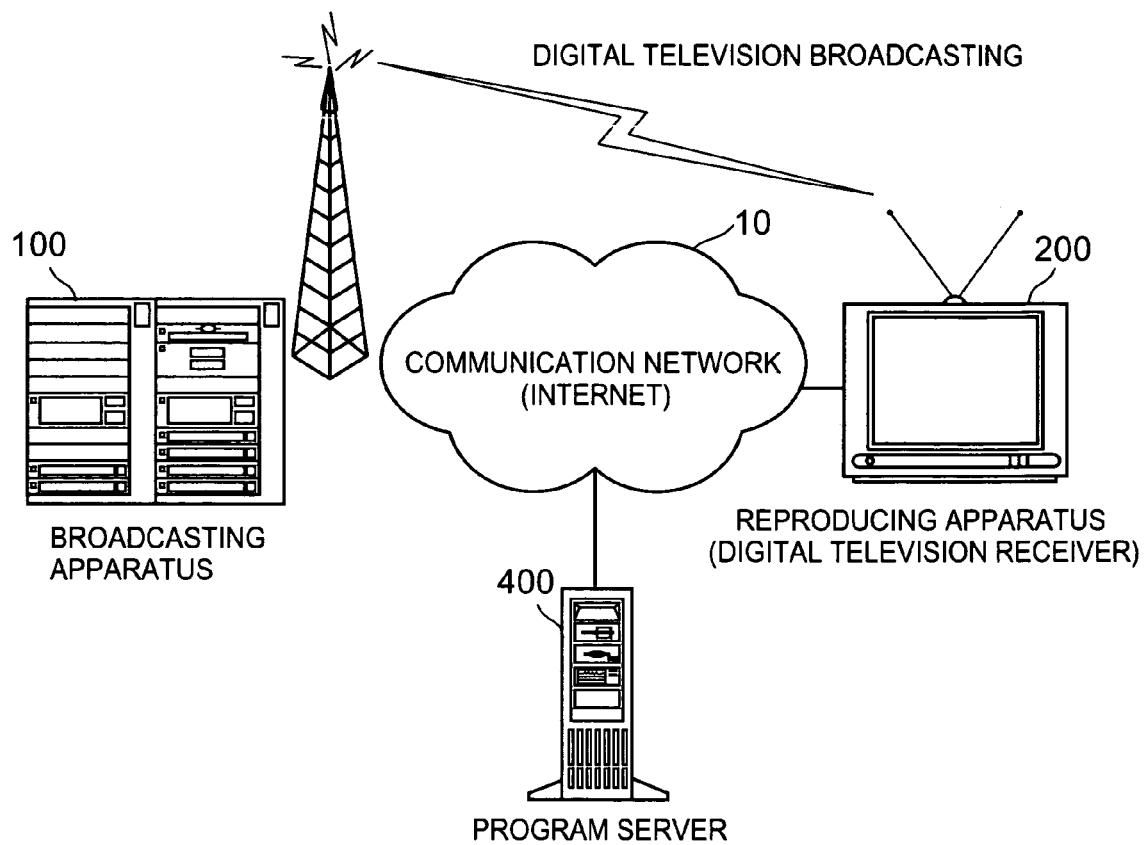
FIGS. 16A and 16B are diagrams exemplarily showing the configuration of a system according to the embodiment 5 of the present invention, where

For example, in a case where the present embodiment is realized by the broadcasting system 1 according to the above-described embodiment 1 to 3, it is configured as shown in FIG. 16A. That is, the present embodiment comprises the broadcasting apparatus 100, the reproducing apparatus 200 (digital television receiver), and further a program server 400 which is connected to the reproducing apparatus 200 via the communication network 10.

In this case, the reproducing apparatus 200 (digital television receiver) comprises configuration required for connecting to the communication network 10 such as an NIC (Network Interface Card), a modem, etc., in addition to the configuration of the reproducing apparatus 200 shown in the embodiment 1.

The program sever 400 is constituted by a computer apparatus such as, for example, a mainframe, a workstation, a personal computer, etc., and provides a decoding program to be executed by the reproducing apparatus 200 to the reproducing apparatus 200, in response to a request from the reproducing apparatus 200 arriving through the communication network 10.

To be more specific, the program server 400 pre-stores various decoding programs, selects a corresponding decoding program in response to a request from the reproducing apparatus 200, and provides the selected decoding program to the reproducing apparatus 200 having requested that decoding program.

Figure 16B:
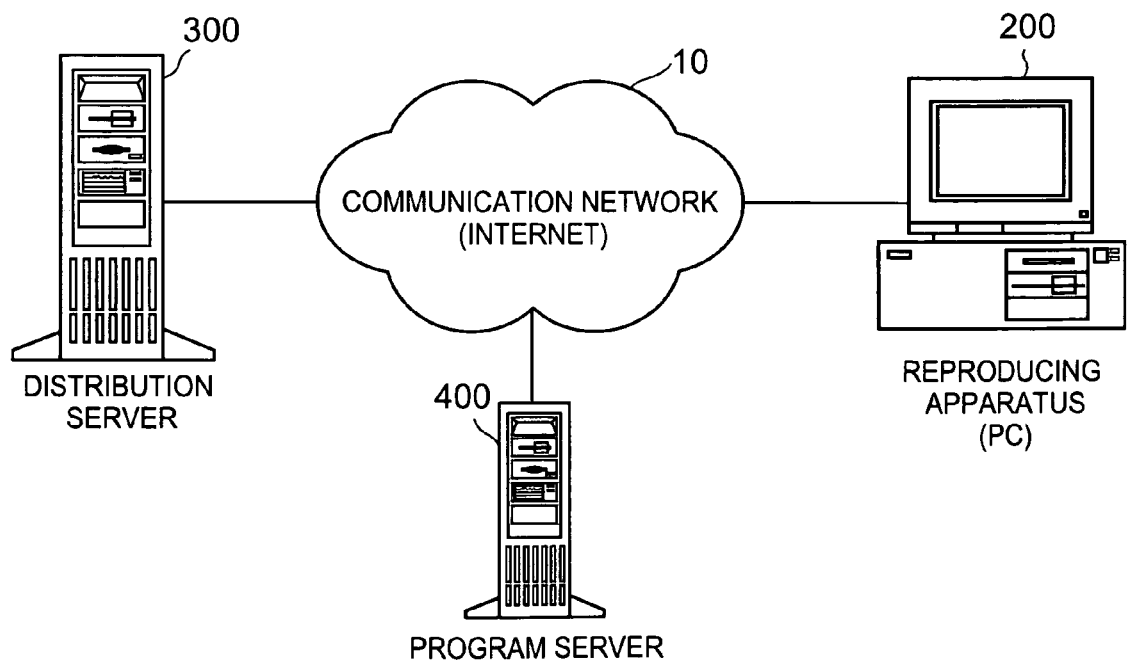

In a case where the present embodiment is realized by the distribution system 2 according to the embodiment 4, it is configured as shown in FIG. 16B where the reproducing apparatus 200, the distribution server 300, and the program server 400 are connected to one another via the communication network 10. The distribution server 300 and the program server 400 may be constituted by the same computer apparatus.

In such configuration of the present embodiment, the broadcasting apparatus 100 and the distribution server 300 comprise the same configuration as the data generation unit 120 shown in the embodiment 1 to 3 to generate a data stream of a content.

In the above-described embodiments, a decoding program is multiplexed on the content data to generate a data stream in which packets of the content data (packets C1 and packets C2) and packets of the decoding program (packets PP) are arranged in an order. According to the present embodiment, ID information indicating a corresponding decoding program is to be included instead of the packets PP. That is, the data stream including the content data does not include the decoding program itself.

The broadcasting apparatus 100 or the distribution server 300 generates such a data stream and transmits it to the reproducing apparatus 200.

The reproducing apparatus 200, when acquiring the ID information included in the received data stream, gains access to the program server 400 via the communication network 10. At this time, the reproducing apparatus 200 notifies the acquired ID information to the program server 400 and requests the decoding program corresponding to the ID information. In a case where the decoding program identified by the ID information is already acquired by the reproducing apparatus 200, the apparatus 200 may not need to request it from the program server 400.

The program server 400 selects and extracts the decoding program corresponding to the notified ID information from among the stored decoding programs, and transmits it to the reproducing apparatus 200 having requested it via the communication network 10.

The reproducing apparatus 200 receives the decoding program from the program server 400 and installs it. Until the installation is completed, the reproducing apparatus 200 decodes the content data arriving from the broadcasting apparatus 100 or the distribution server 300 by executing a decoding program corresponding to the default coding method. Specifically, as explained in the embodiment 1, the data stream of the content data includes a redundancy period corresponding to the required application time at the reproducing apparatus 200. Therefore, the reproducing apparatus 200 can decode the content data by a decoding program corresponding to the default coding method until the decoding program downloaded from the program server 400 is executable.

When the received decoding program is completely installed and becomes executable, the reproducing apparatus 200 performs decoding by executing this decoding program. That is, since decoding corresponding to the changeable coding method is made available, the packets C2 building up the data stream of the content data can be decoded by the decoding program corresponding to the changeable coding method.

According to such configuration, ID information indicating the decoding program is only needed to be included, greatly reducing the amount of coding of the data stream and promoting efficient use of the bandpass.

By separating the decoding program from the stream of the content data, it is possible to forgo decoding the same decoding program plural times in a case where different contents require the same program. In this case, the downloaded decoding program may be cached in a memory or the like, so that another downloading may be omitted and the bandpass can be efficiently utilized.

According to the embodiment 1 to 4, a decoding program has to be multiplexed on all content data in case any reproducing apparatus 200 is un-adapted to the changeable coding method. This means that a reproducing apparatus 200 already adapted to the changeable coding method also has to receive and process a redundant data stream having a decoding program multiplexed thereon. In contrast, according to the configuration of the present embodiment, in a case where a reproducing apparatus 200 is adapted to the changeable coding method, it needs not request the provision of a program from the program server 400. Since there is no need of performing a redundant process, the load weighing on the decoding process is reduced and the process efficiency is increased. Furthermore, an appropriate decoding process can be executed in a multiplatform environment or environments having various restrictions.

The program server 400 according to the embodiment 5 may store decoding programs in cooperation with the apparatus on the coding side (the broadcasting apparatus 100 or the distribution server 300). Specifically, the coding apparatus and the program server 400 may be connected to each other via the communication network 10 and the coding apparatus may dynamically register decoding programs to the program server 400.

When the reproducing apparatus 200 requests a decoding program from the program server 400, the reproducing apparatus 200 may include, for example, information regarding the reproducing apparatus 200 in the ID information indicating the decoding program to request. In this case, the ID information may also include information indicating the mode prioritized by the reproducing apparatus 200 (such as, image quality or low power consumption preferred to the other, image quality or program size preferred to the other, etc.), or information indicating the frequency of occurrence of transmission error in the reproducing apparatus 200. The program server 400 may select an appropriate decoding program based on these kinds of information, and provides such a program to the reproducing apparatus 200.

Embodiment 6

In the above-described embodiments, a case has been shown where a content is provided through data transmission and reception via television broadcasting or a communication network 10. The present invention can also be applied to a recording medium such as a DVD (Digital Versatile Disk) having a motion picture content recorded thereon.

In this case, a recording medium (for example, a DVD) stores first content data obtained by coding a content by the default coding method (first coding method), second content data obtained by coding the content by the changeable coding method (second coding method) different from the default coding method, and a decoding program for decoding the data coded by the changeable coding method. The first content data and the second content data are the same data coded by the different coding methods, and have the same data assigned thereto for enabling identification of the order of each data part in the entire data. In this case, for example, the same time data indicating the time that has elapsed from the top of the content, or the like is assigned to the first and second content data.

A decoding apparatus to which the present invention is applied decodes and reproduces the content recorded on such a recording medium (DVD). Specifically, a decoding apparatus (for example, a DVD player or the like) having a similar configuration to the reproducing apparatus 200 according to the above-described embodiments reproduces the content, which decoding apparatus comprises configuration for reading the recording medium instead of the configuration of the receiving unit 210 described above.

The reproducing procedure of such a decoding apparatus is as follows. First, the decoding apparatus starts decoding and reproducing the first content data recorded on the recording medium (DVD), and acquires the decoding program for decoding the second content data from the recording medium (DVD) while continuing reproducing the first content data. Then, when the acquired decoding program is made executable in the decoding apparatus, the decoding apparatus refers to the time data on the first content data at that timing, and starts decoding the second content data from the part to which time data same as the referred time data is assigned. That is, at the timing the decoding apparatus becomes adapted to the changeable coding method, the data to be reproduced and output is switched from the decoded data of the first content data to that of the second content data.

By using the data generation unit 120, the output unit 130, and the decoding unit 220 according to the above-described embodiments, the following effects can be achieved.

First, according to the embodiment 1 to 4 and 6, since the decoding program and the content data can be integrated to one data stream, these can be managed unitarily by the same file type and data handling can be simplified. Furthermore, the decoding program can be directly installed from such an integrated data stream, eliminating the need of preparing a library separately.

According to the above-described embodiments, the decoding program is changeable according to the content of the data stream, and various decoding programs can be selected in accordance with the content. In this case, it is possible to incorporate the latest technique easily and quickly, without waiting for the standardization of the algorithms becoming more and more complicated.

According to the above-described embodiments, since the beginning of the data stream (content) is coded by the default coding method only, the latency at the beginning of the reproduction that has been the problem with the prior art is solved, allowing a quick start of the reproduction.

According to the above-described embodiments, the information representing the compatibility with the default coding method that is added to the data coded by the changeable coding method allows the reproducing apparatus 200 to know that the data can be decoded by a decoding process corresponding to the default coding method if such is the case. Therefore, even a reproducing apparatus 200 un-adapted to the changeable coding method can decode the data coded by the changeable coding method if the data is compatible with the default coding method. Consequently, even if the time at which the installation of the decoding program will be completed cannot be predicted correctly due to poor network environment, low processing performance of the reproducing apparatus 200, etc., the decoding programs (algorithms) can be switched safely.

The above-described embodiments are mere examples of how the present application is applied, and the scope of the present invention is not limited by the above-described embodiments. The present invention may be applied in various embodiments other than the above-described embodiments, which are also to be included in the scope of the present invention.

For example, according to the above-described embodiments, the program to be provided together with the content data is a decoding program. The program to be provided is not limited to a decoding program, but various other programs may be provided.

According to the above-described embodiments, video (motion picture) data and audio data are handled together as content data to facilitate understanding. However, different programs for the motion pictures and the audios respectively may be multiplexed. Content data may include data other than motion pictures and audios. Alternatively, content data may only include motion pictures or audios.

According to the above-described embodiments, a case has been illustrated where coding by the changeable coding method is applied to motion picture data. Coding by the changeable coding method may be applied to audio data. In this case, for example, with a scalable coding (hierarchical coding) method such as TwinVQ as the basic coding method, only the default coding method is selected in a backward layer whereas both the default coding method and the changeable coding method are selected in an upward layer. This scheme enables a coding process similar to the coding process for the motion picture data described above to be applied to audio data.

According to the above-described embodiments, the reproducing apparatus 200 performs decoding by using the same decoding algorithm as that used in local decoding by the data generation unit 120. However, the algorithms and architectures used by the coder side and the decoder side may be different from each other. In this case, the coder side may multiplex a decoding program suitable for the decoding at the decoder side on the content data.

According to the above-described embodiments, the coding method is arranged to be switched to the changeable coding method when the inter-prediction coding mode that is in a more upward layer is selected. However, switching to the changeable coding method may be arranged when coding by the intra-prediction coding mode or entropy coding is selected. Alternatively, the coding method may be arranged to be switched to the changeable coding method for a much more upward process unit and may be arranged to be switched to the default coding method for a more backward process unit, respectively. That is, the coding method may be arranged to be switched to the changeable coding method in accordance with the process content. Further, for example, if the coding method is arranged to be switched to the changeable coding method for a module for parsing the grammatical structure of the stream to be coded, it is possible to add a grammatical element that does not exist in the default algorithm. This makes it possible to introduce other completely different coding methods while suppressing the amount of processing and amount of coding.

The decoding program for decoding the data coded by the default coding method may be, for example, the algorithm that is set when initial setting is made, and needs not be fixedly stored on a ROM (Read Only Memory) or the like. That is, the decoding program for the default coding method may itself be changeable and sequentially rewritable.

According to the above-described embodiments, multiplexing is performed by arranging the packets of the decoding program and the packets of the content data in an order. However, the multiplexing method is arbitrary, and may be based on existing standards such as MPEG-2 System, MPEG-4 System, etc. In this case, differentiation by means of the above-described packet type and flag may be set inside the content data.

According to the embodiment 1 to 5, the present invention is applied to wide area transmission such as television broadcasting or Internet data distribution, etc. However, the present invention may be applied to narrower area transmission utilizing a wireless LAN (Local Area Network) or the like. For example, the present invention may be applied to television receivers having a tuner device and a display device separately, which are connected to each other wirelessly by utilizing a wireless LAN. In this case, the tuner device comprises the same configuration as the data generation unit 120 shown in the embodiment 1, so that the tuner device will receive, for example an analog television broadcast, code the received analog signal, and transmit it to the display device. At this time, the tuner device transmits the signal by multiplexing a program needed by the display device, thereby enabling the display device to be upgraded as required.

The functions of the data generation unit 120 and output unit 130 according to the above-described embodiments may be realized by independent apparatuses. Such an apparatus may be realized by a specialized apparatus, or may be realized by a general-purpose computer apparatus such as a personal computer. In the latter case, an operation program for realizing the function of the data generation unit 120 or the output unit 130 shown in the above-described embodiments is installed in a general-purpose computer apparatus, and a CPU or the like executes the installed program, so that the general-purpose computer apparatus can be used as an apparatus having the same function as that of the data generation unit 120 or the output unit 130.

Such an operation program may be provided by being incorporated in advance in the general-purpose computer apparatus, or may be provided by itself. In the latter case, the manner of distributing the operation program is arbitrary, so the program may be distributed while stored in a recording medium such as a CD-ROM, a DVD, etc., or may be distributed via a communication medium such as the Internet, etc.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-369894 filed on Dec. 21, 2004 and including specification, claims, drawings and summary. The disclosure of the above Japanese patent application is incorporated herein by reference in its entirety.

What is claimed is:

1. A data output apparatus comprising:
a first coding unit which generates first coded data by coding content data representing a predetermined content by a first coding method;
a second coding unit which generates second coded data by coding the content data by a second coding method different from the first coding method;
a data stream generation unit which generates a data stream from the first coded data and the second coded data; and
an output unit which outputs the data stream generated by the data stream generation unit, and a decoding program corresponding to at least the second coding method;
wherein the output unit outputs the decoding program plural times repeatedly while it is outputting the data stream; and
wherein the output unit varies an occupation rate per unit time of the decoding program in the coded content data, in accordance with a number of output times that the decoding program has been output.

2. The data output apparatus according to claim 1, wherein the output unit outputs the data stream and the decoding program simultaneously.

3. The data output apparatus according to claim 1, wherein the output unit outputs the data stream and the decoding program by multiplexing the decoding program on the data stream.

4. The data output apparatus according to claim 1, wherein the output unit outputs the decoding program when it outputs the first coded data in the data stream.

5. The data output apparatus according to claim 1, further comprising a coding method selection unit which selects a coding method for the content data to be coded, in accordance with a predetermined condition.

6. The data output apparatus according to claim 5, wherein the coding method selection unit selects the first coding method at a beginning of a data stream to be generated.

7. The data output apparatus according to claim 5, wherein the coding method selection unit selects the first coding method in a redundancy period corresponding to the decoding program.

8. The data output apparatus according to claim 5, wherein the coding method selection unit selects the first coding method at a predetermined timing, so that the content can be reproduced by a decoding apparatus that is not adapted to the second coding method.

9. The data output apparatus according to claim 1, wherein the data stream includes compatibility information indicating compatibility between the second coded data in the generated data stream and the first coding method.

10. A recording medium storing a program for controlling a computer to perform a process comprising:
acquiring content data representing a predetermined content;
selecting a coding method for coding the acquired content data;
determining a switching timing at which coding methods are switched;
switching the selected coding method to another coding method at the determined switching timing;
coding the content data by the selected coding method;
generating a data stream comprising the coded content data; and
outputting a decoding program corresponding to one of the coding methods, and the generated data stream;
wherein the decoding program is output plural times repeatedly while the data stream is output; and
wherein an occupation rate per unit time of the decoding program in the coded content data is varied in accordance with a number of output times that the decoding program has been output.

* * * * *